(12) United States Patent
Young

(10) Patent No.: US 8,604,105 B2
(45) Date of Patent: Dec. 10, 2013

(54) FLAME RETARDANT COPOLYESTER COMPOSITIONS

(75) Inventor: Robert Erik Young, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 13/222,918

(22) Filed: Aug. 31, 2011

(65) Prior Publication Data

US 2012/0065304 A1 Mar. 15, 2012

Related U.S. Application Data

(60) Provisional application No. 61/444,489, filed on Feb. 18, 2011, provisional application No. 61/379,776, filed on Sep. 3, 2010.

(51) Int. Cl.
| | | |
|---|---|---|
| *C08K 5/3492* | (2006.01) | |
| *C08K 5/5313* | (2006.01) | |
| *C08K 3/32* | (2006.01) | |
| *C08K 3/10* | (2006.01) | |

(52) U.S. Cl.
USPC ............ 524/100; 524/133; 524/414; 524/437

(58) Field of Classification Search
USPC ................. 524/100, 133, 414, 437
See application file for complete search history.

(56) References Cited

U.S. PATENT DOCUMENTS

| | | | |
|---|---|---|---|
| 3,594,347 A * | 7/1971 | Lazarus et al. ............ 524/135 |
| 3,772,405 A | 11/1973 | Hamb | |
| 4,208,321 A * | 6/1980 | Sandler .................. 525/420 |
| 5,006,634 A | 4/1991 | Nakane et al. | |
| 5,021,545 A | 6/1991 | Nakane et al. | |
| 5,047,459 A | 9/1991 | Walde | |
| 5,116,891 A | 5/1992 | Eberspach et al. | |
| 5,124,379 A | 6/1992 | Cipolli et al. | |
| 5,145,941 A | 9/1992 | Munday et al. | |
| 5,151,494 A | 9/1992 | Munday et al. | |
| 5,189,085 A | 2/1993 | Horacek | |
| 5,194,574 A | 3/1993 | Morris et al. | |
| 5,198,483 A | 3/1993 | Gainer | |
| 5,281,637 A | 1/1994 | Blocker | |
| 5,312,853 A | 5/1994 | Staendeke et al. | |
| 5,314,937 A | 5/1994 | Cipolli et al. | |
| 5,314,938 A | 5/1994 | Cipolli et al. | |
| 5,331,030 A | 7/1994 | Cipolli et al. | |
| 5,344,855 A | 9/1994 | Narita et al. | |
| 5,369,157 A | 11/1994 | Wirth | |
| 5,384,347 A | 1/1995 | Horacek | |
| 5,399,428 A | 3/1995 | Asrar | |
| 5,399,429 A | 3/1995 | Asrar | |
| 5,409,976 A | 4/1995 | Lindsay | |
| 5,410,000 A | 4/1995 | Borman | |
| 5,430,080 A | 7/1995 | Iwata et al. | |
| 5,530,088 A | 6/1996 | Sheen et al. | |
| 5,534,573 A | 7/1996 | Leake | |
| 5,550,207 A | 8/1996 | Neri et al. | |
| 5,614,573 A | 3/1997 | Sano et al. | |
| 5,654,347 A * | 8/1997 | Khemani et al. ............ 521/138 |
| 5,684,071 A | 11/1997 | Mogami et al. | |
| 5,696,176 A * | 12/1997 | Khemani et al. ............ 521/81 |
| 5,780,534 A | 7/1998 | Kleiner et al. | |
| 5,891,226 A | 4/1999 | Kleiner et al. | |
| 5,955,565 A | 9/1999 | Morris et al. | |
| 5,985,960 A | 11/1999 | de Keijzer et al. | |
| 5,989,665 A | 11/1999 | Connell et al. | |
| 5,998,519 A | 12/1999 | Goertz et al. | |
| 6,013,707 A | 1/2000 | Kleiner et al. | |
| 6,103,797 A | 8/2000 | Klatt et al. | |
| 6,114,421 A | 9/2000 | Malcangi | |
| 6,120,889 A | 9/2000 | Turner et al. | |
| 6,136,892 A | 10/2000 | Yamauchi et al. | |
| 6,156,825 A | 12/2000 | Horold et al. | |
| 6,207,736 B1 | 3/2001 | Nass et al. | |
| 6,255,371 B1 | 7/2001 | Schlosser et al. | |
| 6,270,560 B1 | 8/2001 | Kleiner et al. | |
| 6,344,158 B1 | 2/2002 | Schlosser et al. | |
| 6,365,071 B1 | 4/2002 | Jenewein et al. | |
| 6,420,459 B1 | 7/2002 | Horold | |
| 6,433,045 B1 | 8/2002 | Hanabusa et al. | |
| 6,472,456 B1 | 10/2002 | Horsey et al. | |
| 6,503,969 B1 | 1/2003 | Klatt et al. | |
| 6,538,054 B1 | 3/2003 | Klatt et al. | |
| 6,547,992 B1 | 4/2003 | Schlosser et al. | |
| 6,555,605 B1 | 4/2003 | Casiraghi | |
| 6,569,974 B1 | 5/2003 | Sicken et al. | |
| 6,599,963 B2 | 7/2003 | Srinivasan et al. | |
| 6,610,796 B2 | 8/2003 | Seo et al. | |

(Continued)

OTHER PUBLICATIONS

"Exolit® OP 1240 for PBT and PET a flame retardant for polyesters based on a metal phosphinate", Clariant, Feb. 2, 2009.
Reilly, Tim, "Flame Retardant Market Update", Clariant, Oct. 1, 2010.
Braun, Ulrike, et al., Flame Retardancy Mechanisms of Aluminium Phosphinate in Combination with Melamine Cyanurate in Glass-Fibre-Reinforced Poly(1,4-butylene terephthalate), Macromolecular Materials and Engineering, 293, (2008), pp. 206-217.
Walters, Richard N., et al., "Molar Group Contributions to Polymer Flammability", Journal of Applied Polymer Science, vol. 87, (2003), pp. 548-563.

(Continued)

*Primary Examiner* — Kriellion Sanders
(74) *Attorney, Agent, or Firm* — Louis N. Moreno

(57) ABSTRACT

The present invention relates to the combination of halogen-free flame retardant additives in a copolyester to improve the flame retardant properties of the copolyester composition while retaining impact properties, methods of making the copolyester composition and articles made from the copolyester composition. More specifically, the present invention relates to the use of a nitrogen containing flame retardant and a metal phosphorous-containing compound in copolyester compositions to improve the flame retardant properties while retaining impact properties, methods of making said copolyester compositions and articles therefrom.

10 Claims, No Drawings

(56) References Cited

U.S. PATENT DOCUMENTS

| | | | |
|---|---|---|---|
| 6,617,379 B2 | 9/2003 | Worku et al. | |
| 6,617,382 B1 | 9/2003 | Pirig et al. | |
| 6,630,526 B2 | 10/2003 | Heinen et al. | |
| 6,639,017 B1 | 10/2003 | Horold et al. | |
| 6,642,288 B1 * | 11/2003 | Hulskotte | 524/100 |
| 6,646,030 B2 | 11/2003 | Heinen et al. | |
| 6,649,674 B2 | 11/2003 | Wagner et al. | |
| 6,710,108 B2 | 3/2004 | Govaerts et al. | |
| 6,716,899 B1 | 4/2004 | Klatt et al. | |
| 6,727,335 B2 | 4/2004 | Sicken et al. | |
| 6,737,455 B2 | 5/2004 | Gosens et al. | |
| 6,737,481 B1 | 5/2004 | Kurian et al. | |
| 6,767,941 B2 | 7/2004 | Van Der Spek et al. | |
| 6,780,905 B2 | 8/2004 | Biennemuller et al. | |
| 6,794,432 B2 | 9/2004 | Murschall et al. | |
| 6,800,678 B2 | 10/2004 | Horsey et al. | |
| 6,828,365 B2 | 12/2004 | Martin | |
| 6,841,222 B2 | 1/2005 | Murschall et al. | |
| 6,872,461 B2 | 3/2005 | Murschall et al. | |
| 6,881,470 B2 | 4/2005 | Murschall et al. | |
| 6,881,785 B2 | 4/2005 | Glockner et al. | |
| 6,964,746 B2 | 11/2005 | Schlosser et al. | |
| 7,005,089 B2 | 2/2006 | Takeuchi et al. | |
| 7,052,764 B2 | 5/2006 | Chang et al. | |
| 7,084,196 B2 | 8/2006 | Troutman et al. | |
| 7,087,666 B2 | 8/2006 | Hoerold et al. | |
| 7,094,819 B2 | 8/2006 | Kakegawa et al. | |
| 7,109,260 B2 | 9/2006 | Kaprinidis et al. | |
| 7,132,466 B2 | 11/2006 | Kierkels et al. | |
| 7,144,527 B2 | 12/2006 | Thewes et al. | |
| 7,144,975 B2 | 12/2006 | Gloeckner et al. | |
| 7,148,276 B2 | 12/2006 | Bauer et al. | |
| 7,153,897 B2 | 12/2006 | Tanaka et al. | |
| 7,163,977 B2 | 1/2007 | Rule | |
| 7,169,838 B2 | 1/2007 | Engelmann et al. | |
| 7,205,346 B2 | 4/2007 | Harashina | |
| 7,235,623 B2 | 6/2007 | Strand et al. | |
| 7,255,814 B2 | 8/2007 | Hoerold et al. | |
| 7,259,200 B2 | 8/2007 | Bauer et al. | |
| 7,273,901 B2 | 9/2007 | Sicken et al. | |
| 7,304,107 B2 | 12/2007 | Alms et al. | |
| 7,332,534 B2 | 2/2008 | Knop et al. | |
| 7,332,563 B2 | 2/2008 | Masuda et al. | |
| 7,358,323 B2 | 4/2008 | Maeda et al. | |
| 7,411,013 B2 | 8/2008 | Harashina et al. | |
| 7,420,007 B2 | 9/2008 | Bauer et al. | |
| 7,423,080 B2 | 9/2008 | Cartier et al. | |
| 7,435,769 B2 | 10/2008 | Kishimoto et al. | |
| 7,439,288 B2 | 10/2008 | Sicken et al. | |
| 7,446,140 B2 | 11/2008 | Bauer et al. | |
| 7,449,508 B2 | 11/2008 | Steib et al. | |
| 7,485,745 B2 | 2/2009 | Maas et al. | |
| 7,498,368 B2 | 3/2009 | Harashina et al. | |
| 7,547,738 B2 | 6/2009 | Kierkels et al. | |
| 7,638,591 B2 | 12/2009 | McKenna et al. | |
| 7,655,715 B2 | 2/2010 | Bauer et al. | |
| 7,662,876 B2 | 2/2010 | Burk et al. | |
| 7,678,852 B2 | 3/2010 | Kaprinidis | |
| 7,700,680 B2 | 4/2010 | Costanzi et al. | |
| 7,754,792 B2 | 7/2010 | Masuda | |
| 7,799,838 B2 | 9/2010 | Vollenberg et al. | |
| 7,812,077 B2 | 10/2010 | Borade et al. | |
| 7,829,614 B2 | 11/2010 | Ding et al. | |
| 7,838,580 B2 | 11/2010 | Bauer et al. | |
| 7,851,528 B2 | 12/2010 | Kanno et al. | |
| 7,855,244 B2 | 12/2010 | Chang et al. | |
| 7,915,374 B2 | 3/2011 | Jenkins et al. | |
| 2002/0061394 A1 * | 5/2002 | Fujita | 428/215 |
| 2002/0111403 A1 | 8/2002 | Gosens et al. | |
| 2003/0083409 A1 | 5/2003 | Bienmuller et al. | |
| 2003/0149145 A1 | 8/2003 | Bienmuller et al. | |
| 2004/0002559 A1 | 1/2004 | Troutman et al. | |
| 2004/0110878 A1 | 6/2004 | Knop et al. | |
| 2004/0176506 A1 | 9/2004 | Sicken et al. | |
| 2004/0225040 A1 | 11/2004 | Hoerold | |
| 2005/0004277 A1 | 1/2005 | Hoerold et al. | |
| 2005/0004278 A1 | 1/2005 | Knop et al. | |
| 2005/0014873 A1 | 1/2005 | Liu et al. | |
| 2005/0032958 A1 | 2/2005 | Bauer et al. | |
| 2005/0049339 A1 | 3/2005 | Knop et al. | |
| 2005/0070642 A1 | 3/2005 | Kierkels et al. | |
| 2005/0080170 A1 | 4/2005 | Martin | |
| 2005/0101704 A1 | 5/2005 | Eisentraeger et al. | |
| 2005/0101707 A1 | 5/2005 | Bauer et al. | |
| 2005/0101708 A1 | 5/2005 | Knop et al. | |
| 2005/0137297 A1 | 6/2005 | De Wit | |
| 2005/0137300 A1 | 6/2005 | Schlosser et al. | |
| 2005/0154099 A1 | 7/2005 | Kobayashi et al. | |
| 2005/0173684 A1 | 8/2005 | Schlosser et al. | |
| 2005/0197440 A1 | 9/2005 | Chen | |
| 2005/0245647 A1 | 11/2005 | Masuda et al. | |
| 2005/0272839 A1 | 12/2005 | Bauer et al. | |
| 2006/0020060 A1 | 1/2006 | Uchiyama | |
| 2006/0020064 A1 | 1/2006 | Bauer et al. | |
| 2006/0041042 A1 | 2/2006 | Thewes et al. | |
| 2006/0069184 A1 | 3/2006 | Otto et al. | |
| 2006/0079612 A1 | 4/2006 | Troutman et al. | |
| 2006/0089435 A1 | 4/2006 | Hoerold et al. | |
| 2006/0138391 A1 | 6/2006 | Drewes et al. | |
| 2006/0142454 A1 | 6/2006 | An et al. | |
| 2006/0183835 A1 | 8/2006 | Hoerold et al. | |
| 2006/0208239 A1 | 9/2006 | Bauer et al. | |
| 2006/0214144 A1 | 9/2006 | Bauer et al. | |
| 2006/0226404 A1 | 10/2006 | Bauer et al. | |
| 2006/0240217 A1 | 10/2006 | Foss et al. | |
| 2006/0276573 A1 | 12/2006 | Masuda et al. | |
| 2006/0287418 A1 | 12/2006 | Bauer et al. | |
| 2007/0021538 A1 | 1/2007 | Bae et al. | |
| 2007/0029532 A1 | 2/2007 | Hansel et al. | |
| 2007/0080330 A1 | 4/2007 | Peters et al. | |
| 2007/0155872 A1 | 7/2007 | Hong et al. | |
| 2007/0161725 A1 | 7/2007 | Janssen | |
| 2007/0173572 A1 | 7/2007 | Mediratta et al. | |
| 2007/0184264 A1 | 8/2007 | Masuda | |
| 2007/0197696 A1 | 8/2007 | Mediratta et al. | |
| 2007/0213436 A1 | 9/2007 | Maas et al. | |
| 2007/0213563 A1 | 9/2007 | Maas et al. | |
| 2007/0225414 A1 | 9/2007 | Bauer et al. | |
| 2007/0228343 A1 | 10/2007 | Roth et al. | |
| 2007/0275242 A1 | 11/2007 | Gopal et al. | |
| 2007/0299171 A1 | 12/2007 | Couillens et al. | |
| 2008/0073629 A1 | 3/2008 | Chen | |
| 2008/0075983 A1 | 3/2008 | Chen | |
| 2008/0090946 A1 | 4/2008 | Steenbakkers-Menting et al. | |
| 2008/0105857 A1 | 5/2008 | Couillens et al. | |
| 2008/0132620 A1 | 6/2008 | Chuah et al. | |
| 2008/0139711 A1 | 6/2008 | Borade et al. | |
| 2008/0146708 A1 | 6/2008 | Bauer et al. | |
| 2008/0210914 A1 | 9/2008 | Hansel et al. | |
| 2008/0233395 A1 | 9/2008 | Masuda | |
| 2008/0241529 A1 | 10/2008 | Bauer et al. | |
| 2008/0246192 A1 | 10/2008 | Kim et al. | |
| 2008/0254245 A1 * | 10/2008 | Penescu et al. | 428/36.7 |
| 2008/0300349 A1 | 12/2008 | Fuchikami et al. | |
| 2009/0036578 A1 | 2/2009 | Elango et al. | |
| 2009/0043013 A1 | 2/2009 | Stahl et al. | |
| 2009/0043016 A1 | 2/2009 | Chang et al. | |
| 2009/0043017 A1 | 2/2009 | Chang et al. | |
| 2009/0043019 A1 | 2/2009 | Chang et al. | |
| 2009/0043021 A1 | 2/2009 | Chang et al. | |
| 2009/0054565 A1 | 2/2009 | Eisentraeger et al. | |
| 2009/0093573 A1 | 4/2009 | Germroth et al. | |
| 2009/0105381 A1 | 4/2009 | Kuijk et al. | |
| 2009/0124733 A1 | 5/2009 | Haruhara et al. | |
| 2009/0124734 A1 | 5/2009 | Pyun et al. | |
| 2009/0137707 A1 | 5/2009 | Bauer et al. | |
| 2009/0166576 A1 | 7/2009 | Miyamoto | |
| 2009/0198011 A1 | 8/2009 | Dangayach et al. | |
| 2009/0234051 A1 | 9/2009 | Endtner et al. | |
| 2009/0253837 A1 | 10/2009 | Takagi et al. | |
| 2009/0260848 A1 * | 10/2009 | Perera et al. | 174/110 SR |
| 2010/0025643 A1 | 2/2010 | Hoerold et al. | |
| 2010/0035495 A1 | 2/2010 | Stijnen | |
| 2010/0044653 A1 | 2/2010 | Dermeik et al. | |

(56) References Cited

U.S. PATENT DOCUMENTS

| | | |
|---|---|---|
| 2010/0056677 A1* | 3/2010 | Janssen et al. .............. 524/101 |
| 2010/0076132 A1 | 3/2010 | Levchik et al. |
| 2010/0087573 A1 | 4/2010 | Cartier et al. |
| 2010/0093239 A1 | 4/2010 | Bauer et al. |
| 2010/0096589 A1 | 4/2010 | Crawford et al. |
| 2010/0104844 A1 | 4/2010 | Rollins et al. |
| 2010/0113654 A1 | 5/2010 | Sugata et al. |
| 2010/0160507 A1 | 6/2010 | Bauer et al. |
| 2010/0168290 A1 | 7/2010 | Ding et al. |
| 2010/0168336 A1 | 7/2010 | Cohoon-Brister |
| 2010/0204377 A1 | 8/2010 | Morikawa et al. |
| 2010/0216918 A1 | 8/2010 | Angeli et al. |
| 2010/0227952 A1 | 9/2010 | Futterer et al. |
| 2010/0233474 A1 | 9/2010 | Haruhara et al. |
| 2010/0233925 A1 | 9/2010 | Webb et al. |
| 2010/0249287 A1 | 9/2010 | Schmidt |
| 2010/0249293 A1 | 9/2010 | Treece et al. |
| 2010/0298474 A1 | 11/2010 | Futterer et al. |
| 2010/0307822 A1 | 12/2010 | Schmidt |
| 2010/0311878 A1 | 12/2010 | Tsuge et al. |
| 2011/0021676 A1 | 1/2011 | Hoerold et al. |
| 2011/0028604 A1 | 2/2011 | Hansel et al. |
| 2011/0034587 A1 | 2/2011 | Lee et al. |
| 2011/0054086 A1 | 3/2011 | Siebecker et al. |
| 2011/0054091 A1 | 3/2011 | Crawford et al. |
| 2011/0071240 A1 | 3/2011 | Ding et al. |
| 2011/0082241 A1 | 4/2011 | Kaneda et al. |

OTHER PUBLICATIONS

"Modifying Processing Characteristics: Modifiers and Processing Aids", Additives for Plastics Handbook, J. Elsevier, (2001), pp. 189-198.

Notification of Transmittal of the International Search Report and the Written Opinion of the International Searching Authority dated Sep. 2, 2011 for International Application No. PCT/US2011/050282.

* cited by examiner

FLAME RETARDANT COPOLYESTER COMPOSITIONS

BACKGROUND OF THE INVENTION

1. Field of the Invention

The present invention relates to the use of a combination of halogen-free flame retardant additives in a copolyester to improve the flame retardant properties of the copolyester composition while retaining impact properties. More specifically, the present invention relates to the use of a nitrogen containing flame retardant and a metal phosphinate in copolyesters to improve the flame retardant properties while retaining impact properties.

2. Background

Flame retardant materials are added to some polymers to improve flame resistance, particularly to meet specific fire standards such as UL94 V0 or Class A according to ASTM-E-84. However, the addition of flame retardant materials in amount sufficient to meet the fire standards may have a deleterious effect on impact resistance of copolyester film or sheet containing an effective amount of the flame retardant materials.

Copolyesters can be flame retarded in a variety of means but these methods have some drawbacks. Halogen compounds such as Declorane Plus, decabromodiphenyl oxide or decabromodiphenyl ether can be effective flame retardants, but are objectionable in the marketplace due to fears of smoke toxicity during combustion, the formation of dioxin-type compounds during combustion or bio-accumulation. Liquid phosphorous compounds such as triphenyl phosphite or triphenyl phosphate can flame retard copolyesters but at effective use levels, they plasticize and soften the copolyester thus reducing heat resistance to distortion. Solid flame retardants in the melamine and phosphorous classes can be used as well, but in the past, the concentrations needed to achieve flame retardancy have made the copolyester brittle or reduced tensile strength properties. Plastics used in interior finish applications such as wall protection products and housings for handheld and stationary appliances all have flammability requirements specified in various codes or standards. These applications also have durability or physical property requirements in addition to flammability requirements. Additionally, some building and construction and appliance applications have banned the use of halogen containing compounds. Consequently, there is a need for copolyesters used in these applications that retain physical properties and use non-halogen flame retardants.

There exists a need for an improved copolyester composition comprising non-halogen flame retardants and film or sheets which exhibit good flame resistance and impact resistance.

BRIEF SUMMARY OF THE INVENTION

In one aspect the present invention comprises a copolyester composition comprising:
(a) from 96 to 98 weight % copolyester, the copolyester comprising
  (i) a diacid component comprising
    from 70 to 100 mole % residues of terephthalic acid and from 0 to 30 mole % residues of a modifying aromatic diacid having from 8 to 12 carbon atoms, and
    from 0 to 10 mole % residues of an aliphatic dicarboxylic acid; and
  (ii) a glycol component comprising
    1 to 50 mole % cyclohexanedimethanol residues and 50 to 99 mole % of a modifying glycol having 2 to 20 carbon atoms;
(b) from 2 to 4 weight % of a flame retardant mixture comprising
  (i) a melamine and
  (ii) a metal phosphinate,
wherein the copolyester composition has a Class A or Class 1 rating according to ASTM E-84 or V0 rating according to UL 94,
wherein the weight % is based on the weight of the copolyester, and
wherein the total mole % of the dicarboxylic acid component is 100 mole %, and the total mole % of the glycol component is 100 mole %.

In one aspect the present invention comprises a method of making a copolyester composition, the method comprising:
(a) from 96 to 98 weight % copolyester, the copolyester comprising
  (i) a diacid component comprising
    from 70 to 100 mole % residues of terephthalic acid and from 0 to 30 mole % residues of a modifying aromatic diacid having from 8 to 12 carbon atoms, and
    from 0 to 10 mole % residues of an aliphatic dicarboxylic acid; and
  (ii) a glycol component comprising
    1 to 50 mole % cyclohexanedimethanol residues and 50 to 99 mole % of a modifying glycol having 2 to 20 carbon atoms;
(b) from 2 to 4 weight % of a flame retardant mixture comprising
  (i) a melamine and
  (ii) a metal phosphinate,
wherein the copolyester composition has (1) a UL 94 V0 rating or (2) a Class A or Class 1 rating according to ASTM E-84,
wherein the weight % is based on the weight of the copolyester, and wherein the total mole % of the dicarboxylic acid component is 100 mole %, and the total mole % of the glycol component is 100 mole %.

In one aspect the present invention comprises an article comprising a copolyester composition comprising:
(a) from 96 to 98 weight % copolyester, the copolyester comprising
  (i) a diacid component comprising
    from 70 to 100 mole % residues of terephthalic acid and from 0 to 30 mole % residues of a modifying aromatic diacid having from 8 to 12 carbon atoms, and
    from 0 to 10 mole % residues of an aliphatic dicarboxylic acid; and
  (ii) a glycol component comprising
    1 to 50 mole % cyclohexanedimethanol residues and 50 to 99 mole % of a modifying glycol having 2 to 20 carbon atoms;
(b) from 2 to 4 weight % of a flame retardant mixture comprising
  (i) a melamine and
  (ii) a metal phosphinate,
wherein the copolyester composition has (1) a UL 94 V0 rating or (2) a Class A or Class 1 rating according to ASTM E-84, wherein the weight % is based on the weight of the copolyester, and wherein the total mole % of the dicarboxylic acid component is 100 mole %, and the total mole % of the glycol component is 100 mole %.

In one aspect the present invention comprises a copolyester composition comprising:
(a) from greater than 85 to less than 92.5 weight % copolyester, the copolyester comprising
  (i) a diacid component comprising
    from 70 to 100 mole % residues of terephthalic acid and from 0 to 30 mole % residues of a modifying aromatic diacid having from 8 to 12 carbon atoms, and
    from 0 to 10 mole % residues of an aliphatic dicarboxylic acid; and
  (ii) a glycol component comprising
    1 to 50 mole % cyclohexanedimethanol residues and 50 to 99 mole % of a modifying glycol having 2 to 20 carbon atoms;
(b) from greater than 7.5 to less than 15 weight % of a flame retardant mixture comprising
  (i) a melamine and
  (ii) a metal phosphinate,
wherein the copolyester composition has a UL 94 V0 rating,
where in the copolyester composition has an energy at maximum load greater than 8 Joules measured on a 100 mm×100 mm×1.5 mm plaque according to ASTM D3763,
wherein the weight % is based on the weight of the copolyester, and
wherein the total mole % of the dicarboxylic acid component is 100 mole %, and the total mole % of the glycol component is 100 mole %.

In another aspect the present invention comprises a method of making a copolyester composition, the method comprising blending
(a) from greater than 85 to less than 92.5 weight % of a copolyester comprising
  (i) a diacid component comprising
    from 70 to 100 mole % residues of terephthalic acid and from 0 to 30 mole % residues of a modifying aromatic diacid having from 8 to 12 carbon atoms, and
    from 0 to 10 mole % residues of an aliphatic dicarboxylic acid; and
  (ii) a glycol component comprising
    1 to 50 mole % cyclohexanedimethanol residues and 50 to 99 mole % of a modifying glycol having 2 to 20 carbon atoms; and
(b) from greater than 7.5 to less than 15 weight % of a flame retardant mixture comprising a melamine and a metal phosphinate,
to form the copolyester composition,
wherein the copolyester composition has a UL 94 V0 rating,
where in the copolyester composition has an energy at maximum load greater than 8 Joules measured on a 100 mm×100 mm×1.5 mm plaque according to ASTM D3763,
wherein the weight % is based on the weight of the copolyester, and
wherein the total mole % of the dicarboxylic acid component is 100 mole % and the total mole % of the glycol component is 100 mole %.

In another aspect the present invention comprises an article comprising a copolyester composition comprising
(a) greater than 85 to less than 92.5 weight % of a copolyester comprising
  (i) a diacid component comprising
    from 70 to 100 mole % residues of terephthalic acid and from 0 to 30 mole % residues of a modifying aromatic diacid having from 8 to 12 carbon atoms, and
    from 0 to 10 mole % residues of an aliphatic dicarboxylic acid; and
  (ii) a glycol component comprising
    1 to 50 mole % cyclohexanedimethanol residues and 50 to 99 mole % of a modifying glycol having 2 to 20 carbon atoms; and
(b) from greater than 7.5 to less than 15 weight % of a flame retardant mixture consisting of a melamine and a metal phosphinate,
to form the copolyester composition,
wherein the copolyester composition has a UL 94 V0 rating,
wherein the copolyester composition has an energy at maximum load greater than 8 Joules measured on a 100 mm×100 mm×1.5 mm plaque according to ASTM D3763,
wherein the weight % is based on the weight of the copolyester, and
wherein the total mole % of the dicarboxylic acid component is 100 mole % and the total mole % of the glycol component is 100 mole %.

In one aspect the present invention comprises a copolyester composition comprising:
(a) from greater than 90 to about 98 weight % copolyester, the copolyester comprising
  (i) a diacid component comprising
    from 70 to 100 mole % residues of terephthalic acid and from 0 to 30 mole % residues of a modifying aromatic diacid having from 8 to 12 carbon atoms, and
    from 0 to 10 mole % residues of an aliphatic dicarboxylic acid; and
  (ii) a glycol component comprising
    1 to 50 mole % cyclohexanedimethanol residues and 50 to 99 mole % of a modifying glycol having 2 to 20 carbon atoms;
(b) from greater than 2 to less than 10 weight % of a flame retardant mixture comprising
  (i) a melamine and
  (ii) a metal phosphinate,
wherein the copolyester composition has a Class 1 or Class A rating according to ASTM E-84,
wherein the copolyester composition has an energy at maximum load greater than 8 Joules measured on a 100 mm×100 mm×1.5 mm plaque according to ASTM D3763.
wherein the weight % is based on the weight of the copolyester, and wherein the total mole % of the dicarboxylic acid component is 100 mole %, the total mole % of the glycol component is 100 mole %.

In one aspect the present invention comprises a method of making a copolyester composition, the method comprising blending
(a) from greater than 90 to about 98 weight % of a copolyester comprising
  (i) a diacid component comprising
    from 70 to 100 mole % residues of terephthalic acid and from 0 to 30 mole % residues of a modifying aromatic diacid having from 8 to 12 carbon atoms, and
    from 0 to 10 mole % residues of an aliphatic dicarboxylic acid; and (ii) a glycol component comprising
    1 to 50 mole % cyclohexanedimethanol residues and
    50 to 99 mole % of a modifying glycol having 2 to 20 carbon atoms; and
(b) from greater than 2 to less than 10 weight % of a flame retardant mixture comprising a melamine and a metal phosphinate,
to form the copolyester composition,
wherein the copolyester composition has a Class 1 or Class A rating according to ASTM E-84.

In one aspect the present invention comprises an article comprising a copolyester composition comprising
(a) greater than 90 to less than 98 weight % of a copolyester comprising
    (i) a diacid component comprising
        from 70 to 100 mole % residues of terephthalic acid and from 0 to 30 mole % residues of a modifying aromatic diacid having from 8 to 12 carbon atoms, and
        from 0 to 10 mole % residues of an aliphatic dicarboxylic acid; and
    (ii) a glycol component comprising
        1 to 50 mole % cyclohexanedimethanol residues and
        50 to 99 mole % of a modifying glycol having 2 to 20 carbon atoms; and
(b) from greater than 2 to less than 10 weight % of a flame retardant mixture consisting of a melamine and a metal phosphinate,
to form the copolyester composition,
wherein the copolyester composition has a Class 1 or Class A rating according to ASTM E-84,
wherein the copolyester composition has an energy at maximum load greater than 8 Joules measured on a 100 mm×100 mm×1.5 mm plaque according to ASTM D3763.
wherein the weight % is based on the weight of the copolyester, and
wherein the total mole % of the dicarboxylic acid component is 100 mole %, the total mole % of the glycol component is 100 mole %.

In one aspect the present invention comprises a copolyester composition comprising:
(a) from 96 to 98 weight % copolyester, the copolyester comprising
    (i) a diacid component comprising
        from 70 to 100 mole % residues of terephthalic acid,
        from 0 to 30 mole % residues of a modifying aromatic diacid having from 8 to 12 carbon atoms, and
        from 0 to 10 mole % residues of an aliphatic dicarboxylic acid; and
    (ii) a glycol component comprising
        1 to 65 mole % cyclohexanedimethanol residues, and
        35 to 99 mole % of a modifying glycol having 2 to 20 carbon atoms;
(b) from 2 to 4 weight % of a flame retardant mixture comprising
    (i) a melamine and
    (ii) a metal phosphinate,
wherein the copolyester composition has a Class A or Class 1 rating according to ASTM E-84 or V0 rating according to UL 94,
wherein the weight % is based on the weight of the copolyester, and
wherein the total mole % of the dicarboxylic acid component is 100 mole %, and the total mole % of the glycol component is 100 mole %.

In one aspect the present invention comprises a copolyester composition comprising:
(a) from 96 to 98 weight % copolyester, the copolyester comprising
    (i) a diacid component comprising
        from 70 to 100 mole % residues of terephthalic acid and from 0 to 30 mole % residues of a modifying aromatic diacid having from 8 to 12 carbon atoms, and
    (ii) a glycol component comprising
        1 to 65 mole % cyclohexanedimethanol residues and
        35 to 99 mole % of a modifying glycol having 2 to 20 carbon atoms;
(b) from 2 to 4 weight % of a flame retardant mixture comprising
    (i) a melamine and
    (ii) a metal phosphinate,
wherein the copolyester composition has a Class A or Class 1 rating according to ASTM E-84 or V0 rating according to UL 94,
wherein the weight % is based on the weight of the copolyester, and
wherein the total mole % of the dicarboxylic acid component is 100 mole %, and the total mole % of the glycol component is 100 mole %.

In one aspect the present invention comprises a method of making a copolyester composition, the method comprising:
(a) from 96 to 98 weight % copolyester, the copolyester comprising
    (i) a diacid component comprising
        from 70 to 100 mole % residues of terephthalic acid and from 0 to 30 mole % residues of a modifying aromatic diacid having from 8 to 12 carbon atoms, and
        from 0 to 10 mole % residues of an aliphatic dicarboxylic acid; and
    (ii) a glycol component comprising
        1 to 65 mole % cyclohexanedimethanol residues and
        35 to 99 mole % of a modifying glycol having 2 to 20 carbon atoms;
(b) from 2 to 4 weight % of a flame retardant mixture comprising
    (i) a melamine and
    (ii) a metal phosphinate,
wherein the copolyester composition has (1) a UL 94 V0 rating or (2) a Class A or Class 1 rating according to ASTM E-84,
wherein the weight % is based on the weight of the copolyester, and wherein the total mole % of the dicarboxylic acid component is 100 mole %, and the total mole % of the glycol component is 100 mole %.

In one aspect the present invention comprises a copolyester composition comprising:
(a) from greater than 85 to less than 92.5 weight % copolyester, the copolyester comprising
    (i) a diacid component comprising
        from 70 to 100 mole % residues of terephthalic acid,
        from 0 to 30 mole % residues of a modifying aromatic diacid having from 8 to 12 carbon atoms, and
        from 0 to 10 mole % residues of an aliphatic dicarboxylic acid; and
    (ii) a glycol component comprising
        1 to 65 mole % cyclohexanedimethanol residues and
        35 to 99 mole % of a modifying glycol having 2 to 20 carbon atoms;
(b) from greater than 7.5 to less than 15 weight % of a flame retardant mixture comprising
    (i) a melamine and
    (ii) a metal phosphinate, wherein the copolyester composition has a UL 94 V0 rating, where in the copolyester composition has an energy at maximum load greater than 8 Joules measured on a 100 mm×100 mm×1.5 mm plaque according to ASTM D3763, wherein the weight % is based on the weight of the copolyester, and wherein the total mole % of the dicarboxylic acid component is 100 mole %, and the total mole % of the glycol component is 100 mole %.

In another aspect the present invention comprises a method of making a copolyester composition, the method comprising blending (a) from greater than 85 to less than 92.5 weight % of a copolyester comprising
 (i) a diacid component comprising
  from 70 to 100 mole % residues of terephthalic acid,
  from 0 to 30 mole % residues of a modifying aromatic diacid having from 8 to 12 carbon atoms, and
  from 0 to 10 mole % residues of an aliphatic dicarboxylic acid; and
 (ii) a glycol component comprising
  1 to 35 mole % cyclohexanedimethanol residues and 65 to 99 mole % of a modifying glycol having 2 to 20 carbon atoms; and
(b) from greater than 7.5 to less than 15 weight % of a flame retardant mixture comprising a melamine and a metal phosphinate, to form the copolyester composition, wherein the copolyester composition has a UL 94 V0 rating, where in the copolyester composition has an energy at maximum load greater than 8 Joules measured on a 100 mm×100 mm×1.5 mm plaque according to ASTM D3763, wherein the weight % is based on the weight of the copolyester, and wherein the total mole % of the dicarboxylic acid component is 100 mole % and the total mole % of the glycol component is 100 mole %.

In another aspect the present invention comprises an article comprising a copolyester composition comprising (a) greater than 85 to less than 92.5 weight % of a copolyester comprising
 (i) a diacid component comprising
  from 70 to 100 mole % residues of terephthalic acid,
  from 0 to 30 mole % residues of a modifying aromatic diacid having from 8 to 12 carbon atoms, and
  from 0 to 10 mole % residues of an aliphatic dicarboxylic acid; and
 (ii) a glycol component comprising
  1 to 65 mole % cyclohexanedimethanol residues and 35 to 99 mole % of a modifying glycol having 2 to 20 carbon atoms; and
(b) from greater than 7.5 to less than 15 weight % of a flame retardant mixture consisting of a melamine and a metal phosphinate, to form the copolyester composition, wherein the copolyester composition has a UL 94 V0 rating, wherein the copolyester composition has an energy at maximum load greater than 8 Joules measured on a 100 mm×100 mm×1.5 mm plaque according to ASTM D3763, wherein the weight % is based on the weight of the copolyester, and wherein the total mole % of the dicarboxylic acid component is 100 mole and the total mole % of the glycol component is 100 mole %.

In one aspect the present invention comprises a copolyester composition comprising:

(a) from greater than 90 to about 98 weight % copolyester, the copolyester comprising
 (i) a diacid component comprising
  from 70 to 100 mole % residues of terephthalic acid,
  from 0 to 30 mole % residues of a modifying aromatic diacid having from 8 to 12 carbon atoms, and
  from 0 to 10 mole % residues of an aliphatic dicarboxylic acid; and
 (ii) a glycol component comprising
  1 to 65 mole % cyclohexanedimethanol residues and 35 to 99 mole % of a modifying glycol having 2 to 20 carbon atoms;
(b) from greater than 2 to less than 10 weight % of a flame retardant mixture comprising
 (i) a melamine and
 (ii) a metal phosphinate, wherein the copolyester composition has a Class 1 or Class A rating according to ASTM E-84, wherein the copolyester composition has an energy at maximum load greater than 8 Joules measured on a 100 mm×100 mm×1.5 mm plaque according to ASTM D3763.

wherein the weight % is based on the weight of the copolyester, and wherein the total mole % of the dicarboxylic acid component is 100 mole %, the total mole % of the glycol component is 100 mole %.

In one aspect the present invention comprises a method of making a copolyester composition, the method comprising blending (a) from greater than 90 to about 98 weight % of a copolyester comprising
 (i) a diacid component comprising
  from 70 to 100 mole % residues of terephthalic acid,
  from 0 to 30 mole % residues of a modifying aromatic diacid having from 8 to 12 carbon atoms, and
  from 0 to 10 mole % residues of an aliphatic dicarboxylic acid; and
 (ii) a glycol component comprising
  1 to 65 mole % cyclohexanedimethanol residues and 35 to 99 mole % of a modifying glycol having 2 to 20 carbon atoms; and
(b) from greater than 2 to less than 10 weight % of a flame retardant mixture comprising a melamine and a metal phosphinate, to form the copolyester composition, wherein the copolyester composition has a Class 1 or Class A rating according to ASTM E-84.

In one aspect the present invention comprises an article comprising a copolyester composition comprising (a) greater than 90 to less than 98 weight % of a copolyester comprising
 (i) a diacid component comprising
  from 70 to 100 mole % residues of terephthalic acid,
  from 0 to 30 mole % residues of a modifying aromatic diacid having from 8 to 12 carbon atoms, and
  from 0 to 10 mole % residues of an aliphatic dicarboxylic acid; and
 (ii) a glycol component comprising
  1 to 65 mole % cyclohexanedimethanol residues and 35 to 99 mole % of a modifying glycol having 2 to 20 carbon atoms; and
(b) from greater than 2 to less than 10 weight % of a flame retardant mixture consisting of a melamine and a metal phosphinate, to form the copolyester composition, wherein the copolyester composition has a Class 1 or Class A rating according to ASTM E-84, wherein the copolyester composition has an energy at maximum load greater than 8 Joules measured on a 100 mm×100 mm×1.5 mm plaque according to ASTM D3763.

wherein the weight % is based on the weight of the copolyester, and wherein the total mole % of the dicarboxylic acid component is 100 mole %, the total mole % of the glycol component is 100 mole %.

In one aspect the present invention comprises a method of making a copolyester composition, the method comprising:
 (a) from 96 to 98 weight % copolyester, the copolyester comprising
  (i) a diacid component comprising
   from 70 to 100 mole % residues of terephthalic acid,
   from 0 to 30 mole % residues of a modifying aromatic diacid having from 8 to 12 carbon atoms, and
   from 0 to 10 mole % residues of an aliphatic dicarboxylic acid; and
  (ii) a glycol component comprising
   1 to 35 mole % cyclohexanedimethanol residues and
   65 to 99 mole % of a modifying glycol having 2 to 20 carbon atoms;
 (b) from 2 to 4 weight % of a flame retardant mixture comprising
  (i) a melamine and
  (ii) a metal phosphinate,
wherein the copolyester composition has (1) a UL 94 V0 rating or (2) a Class A or Class 1 rating according to ASTM E-84,
wherein the weight % is based on the weight of the copolyester, and wherein the total mole % of the dicarboxylic acid component is 100 mole %, and the total mole % of the glycol component is 100 mole %.

In one aspect the present invention comprises an article comprising a copolyester composition comprising:
 (a) from 96 to 98 weight % copolyester, the copolyester comprising
  (i) a diacid component comprising
   from 70 to 100 mole % residues of terephthalic acid,
   from 0 to 30 mole % residues of a modifying aromatic diacid having from 8 to 12 carbon atoms, and
   from 0 to 10 mole % residues of an aliphatic dicarboxylic acid; and
  (ii) a glycol component comprising
   1 to 35 mole % cyclohexanedimethanol residues and
   65 to 99 mole % of a modifying glycol having 2 to 20 carbon atoms;
 (b) from 2 to 4 weight % of a flame retardant mixture comprising
  (i) a melamine and
  (ii) a metal phosphinate,
wherein the copolyester composition has (1) a UL 94 V0 rating or (2) a Class A or Class 1 rating according to ASTM E-84,
wherein the weight % is based on the weight of the copolyester, and wherein the total mole % of the dicarboxylic acid component is 100 mole %, and the total mole % of the glycol component is 100 mole %.

In one aspect the present invention comprises a copolyester composition comprising:
 (a) from greater than 85 to less than 92.5 weight % copolyester, the copolyester comprising
  (i) a diacid component comprising
   from 70 to 100 mole % residues of terephthalic acid,
   from 0 to 30 mole % residues of a modifying aromatic diacid having from 8 to 12 carbon atoms, and
   from 0 to 10 mole % residues of an aliphatic dicarboxylic acid; and
  (ii) a glycol component comprising
   1 to 35 mole % cyclohexanedimethanol residues and
   65 to 99 mole % of a modifying glycol having 2 to 20 carbon atoms;
 (b) from greater than 7.5 to less than 15 weight % of a flame retardant mixture comprising
  (i) a melamine and
  (ii) a metal phosphinate,
wherein the copolyester composition has a UL 94 V0 rating,
where in the copolyester composition has an energy at maximum load greater than 8 Joules measured on a 100 mm×100 mm×1.5 mm plaque according to ASTM D3763,
wherein the weight % is based on the weight of the copolyester, and
wherein the total mole % of the dicarboxylic acid component is 100 mole %, and the total mole % of the glycol component is 100 mole %.

In another aspect the present invention comprises a method of making a copolyester composition, the method comprising blending
 (a) from greater than 85 to less than 92.5 weight % of a copolyester comprising
  (i) a diacid component comprising
   from 70 to 100 mole % residues of terephthalic acid,
   from 0 to 30 mole % residues of a modifying aromatic diacid having from 8 to 12 carbon atoms, and
   from 0 to 10 mole % residues of an aliphatic dicarboxylic acid; and
  (ii) a glycol component comprising
   1 to 35 mole % cyclohexanedimethanol residues and
   65 to 99 mole % of a modifying glycol having 2 to 20 carbon atoms; and
 (b) from greater than 7.5 to less than 15 weight % of a flame retardant mixture comprising a melamine and a metal phosphinate,
to form the copolyester composition,
wherein the copolyester composition has a UL 94 V0 rating,
where in the copolyester composition has an energy at maximum load greater than 8 Joules measured on a 100 mm×100 mm×1.5 mm plaque according to ASTM D3763,
wherein the weight % is based on the weight of the copolyester, and
wherein the total mole % of the dicarboxylic acid component is 100 mole % and the total mole % of the glycol component is 100 mole %.

In another aspect the present invention comprises an article comprising a copolyester composition comprising
 (a) greater than 85 to less than 92.5 weight % of a copolyester comprising
  (i) a diacid component comprising
   from 70 to 100 mole % residues of terephthalic acid,
   from 0 to 30 mole % residues of a modifying aromatic diacid having from 8 to 12 carbon atoms, and
   from 0 to 10 mole % residues of an aliphatic dicarboxylic acid; and
  (ii) a glycol component comprising
   1 to 65 mole % cyclohexanedimethanol residues and
   35 to 99 mole % of a modifying glycol having 2 to 20 carbon atoms; and
 (b) from greater than 7.5 to less than 15 weight % of a flame retardant mixture consisting of a melamine and a metal phosphinate, to form the copolyester composition,
wherein the copolyester composition has a UL 94 V0 rating,
wherein the copolyester composition has an energy at maximum load greater than 8 Joules measured on a 100 mm×100 mm×1.5 mm plaque according to ASTM D3763,
wherein the weight % is based on the weight of the copolyester, and wherein the total mole % of the dicarboxylic acid component is 100 mole % and the total mole % of the glycol component is 100 mole %.

In one aspect the present invention comprises a copolyester composition comprising:
(a) from greater than 90 to about 98 weight % copolyester, the copolyester comprising
  (i) a diacid component comprising
    from 70 to 100 mole % residues of terephthalic acid,
    from 0 to 30 mole % residues of a modifying aromatic diacid having from 8 to 12 carbon atoms, and
    from 0 to 10 mole % residues of an aliphatic dicarboxylic acid; and
  (ii) a glycol component comprising
    1 to 65 mole % cyclohexanedimethanol residues and 35 to 99 mole % of a modifying glycol having 2 to 20 carbon atoms;
(b) from greater than 2 to less than 10 weight % of a flame retardant mixture comprising
  (i) a melamine and
  (ii) a metal phosphinate,
wherein the copolyester composition has a Class 1 or Class A rating according to ASTM E-84,
wherein the copolyester composition has an energy at maximum load greater than 8 Joules measured on a 100 mm×100 mm×1.5 mm plaque according to ASTM D3763.
wherein the weight % is based on the weight of the copolyester, and wherein the total mole % of the dicarboxylic acid component is 100 mole %, the total mole % of the glycol component is 100 mole %.

In one aspect the present invention comprises a method of making a copolyester composition, the method comprising blending
(a) from greater than 90 to about 98 weight % of a copolyester comprising
  (i) a diacid component comprising
    from 70 to 100 mole % residues of terephthalic acid,
    from 0 to 30 mole % residues of a modifying aromatic diacid having from 8 to 12 carbon atoms, and
    from 0 to 10 mole % residues of an aliphatic dicarboxylic acid; and
  (ii) a glycol component comprising
    1 to 65 mole % cyclohexanedimethanol residues and 35 to 99 mole % of a modifying glycol having 2 to 20 carbon atoms; and
(b) from greater than 2 to less than 10 weight % of a flame retardant mixture comprising a melamine and a metal phosphinate,
to form the copolyester composition,
wherein the copolyester composition has a Class 1 or Class A rating according to ASTM E-84.

In one aspect the present invention comprises an article comprising a copolyester composition comprising
(a) greater than 90 to less than 98 weight % of a copolyester comprising
  (i) a diacid component comprising
    from 70 to 100 mole % residues of terephthalic acid,
    from 0 to 30 mole % residues of a modifying aromatic diacid having from 8 to 12 carbon atoms, and
    from 0 to 10 mole % residues of an aliphatic dicarboxylic acid; and
  (ii) a glycol component comprising
    1 to 65 mole % cyclohexanedimethanol residues and 35 to 99 mole % of a modifying glycol having 2 to 20 carbon atoms; and
(b) from greater than 2 to less than 10 weight % of a flame retardant mixture consisting of a melamine and a metal phosphinate,
to form the copolyester composition,
wherein the copolyester composition has a Class 1 or Class A rating according to ASTM E-84,
wherein the copolyester composition has an energy at maximum load greater than 8 Joules measured on a 100 mm×100 mm×1.5 mm plaque according to ASTM D3763.
wherein the weight % is based on the weight of the copolyester, and
wherein the total mole % of the dicarboxylic acid component is 100 mole %, the total mole % of the glycol component is 100 mole %.

In one aspect, the copolyester comprises a diacid component comprising 100 mole % TPA, and a glycol component comprising 31 mole % 1,4-CHDM and 69 mole % ethylene glycol wherein the total mole % of the dicarboxylic acid component is 100 mole %, the total mole % of the glycol component is 100 mole %.

In one aspect, the copolyester comprises a diacid component comprising 100 mole % TPA, and a glycol component comprising 3.5 mole % 1,4-CHDM and 96.5 mole % ethylene glycol wherein the total mole % of the dicarboxylic acid component is 100 mole %, the total mole % of the glycol component is 100 mole %.

In one aspect, the copolyester comprises a diacid component comprising 100 mole % TPA, and a glycol component comprising 12 mole % 1,4-CHDM and 88 mole % ethylene glycol wherein the total mole % of the dicarboxylic acid component is 100 mole %, the total mole % of the glycol component is 100 mole %.

In one aspect, the copolyester comprises a diacid component comprising 100 mole % TPA, and a glycol component comprising 20 mole % 1,4-CHDM and 80 mole % ethylene glycol and 0.1 mole % trimellitic anhydride wherein the total mole % of the dicarboxylic acid component is 100 mole %, the total mole % of the glycol component is 100 mole %.

In one aspect, the copolyester comprises a diacid component comprising 100 mole % TPA, and a glycol component comprising 50 mole % 1,4-CHDM and 50 mole % ethylene glycol wherein the total mole % of the dicarboxylic acid component is 100 mole %, the total mole % of the glycol component is 100 mole %.

In one aspect, the copolyester comprises a diacid component comprising 100 mole % TPA, and a glycol component comprising 62.5 mole % 1,4-CHDM and 37.5 mole % ethylene glycol wherein the total mole % of the dicarboxylic acid component is 100 mole %, the total mole % of the glycol component is 100 mole %.

In one aspect the invention comprises a copolyester composition concentrate comprising the copolyester and a mixture of flame retardants, wherein the concentrate comprises greater than 15 weight % of the flame retardants based on the total weight of the concentrate.

In one aspect the invention comprises an article comprising any of the copolyester compositions described above.

In one aspect the invention comprises an article comprising any of the copolyester compositions described above wherein the article is produced by extrusion, injection molding or calendering.

In one aspect the invention comprises a film, sheet or profile comprising any of the copolyester compositions described above.

DETAILED DESCRIPTION

The present invention may be understood more readily by reference to the following detailed description of certain embodiments of the invention and the working examples.

In accordance with the purpose(s) of this invention, certain embodiments of the invention are described in the Summary of the Invention and are further described herein below. Also, other embodiments of the invention are described herein.

The present invention provides a copolyester composition comprising a copolyester and a combination of flame retardants in which the copolyester composition exhibits good flame retardancy and good puncture resistance. The present invention involves the use of two halogen-free flame retardant additives used in combination to improve the flame retardant properties while retaining impact properties. One of the flame retardant additives is an amine-containing compound. The other is a metal phosphinate compound. When the combination of flame retardants are added together at the appropriate concentration with a copolyester, a flame retarded composition which retains ductile instrumented impact properties (ASTM D3763) while achieving a UL94 V0 rating and a Class A rating when tested according to ASTM E-84 is obtained.

Copolyesters useful in the present invention comprise residues of an aromatic diacid and residues of two or more glycols.

The term "copolyester," as used herein, is intended to include "polyesters" and is understood to mean a synthetic polymer prepared by the reaction of one or more difunctional carboxylic acids and/or multifunctional carboxylic acids with one or more difunctional hydroxyl compounds and/or multifunctional hydroxyl compounds. Typically the difunctional carboxylic acid can be a dicarboxylic acid and the difunctional hydroxyl compound can be a dihydric alcohol such as, for example, glycols. Furthermore, as used in this application, the interchangeable terms "diacid" or "dicarboxylic acid" include multifunctional acids, such as branching agents. The term "glycol" as used in this application includes, but is not limited to, diols, glycols, and/or multifunctional hydroxyl compounds. Alternatively, the difunctional carboxylic acid may be a hydroxy carboxylic acid such as, for example, p-hydroxybenzoic acid, and the difunctional hydroxyl compound may be an aromatic nucleus bearing 2 hydroxyl substituents such as, for example, hydroquinone. The term "residue," as used herein, means any organic structure incorporated into a polymer through a polycondensation and/or an esterification reaction from the corresponding monomer. The term "repeating unit," as used herein, means an organic structure having a dicarboxylic acid residue and a diol residue bonded through a carbonyloxy group. Thus, for example, the dicarboxylic acid residues may be derived from a dicarboxylic acid monomer or its associated acid halides, esters, salts, anhydrides, or mixtures thereof. As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a reaction process with a diol to make polyester. As used herein, the term "terephthalic acid" is intended to include terephthalic acid itself and residues thereof as well as any derivative of terephthalic acid, including its associated acid halides, esters, half-esters, salts, half-salts, anhydrides, mixed anhydrides, or mixtures thereof or residues thereof useful in a reaction process with a diol to make polyester. The term "modifying aromatic diacid" means an aromatic dicarboxylic acid other the terephthalic acid. The term "modifying glycol" means a glycol other than 1,4-cyclohexane dimethanol.

In one embodiment, terephthalic acid may be used as the starting material. In another embodiment, dimethyl terephthalate may be used as the starting material. In another embodiment, mixtures of terephthalic acid and dimethyl terephthalate may be used as the starting material and/or as an intermediate material.

The copolyesters used in the present invention typically can be prepared from dicarboxylic acids and diols which react in substantially equal proportions and are incorporated into the copolyester polymer as their corresponding residues. The copolyesters of the present invention, therefore, can contain substantially equal molar proportions of acid residues (100 mole %) and diol (and/or multifunctional hydroxyl compounds) residues (100 mole %) such that the total moles of repeating units is equal to 100 mole %. The mole percentages provided in the present disclosure, therefore, may be based on the total moles of acid residues, the total moles of diol residues, or the total moles of repeating units. For example, a copolyester containing 30 mole % isophthalic acid, based on the total acid residues, means the copolyester contains 30 mole % isophthalic acid residues out of a total of 100 mole % acid residues. Thus, there are 30 moles of isophthalic acid residues among every 100 moles of acid residues. In another example, a copolyester containing 30 mole % 1,4-cyclohexanedimethanol, based on the total diol residues, means the copolyester contains 30 mole % 1,4-cyclohexanedimethanol residues out of a total of 100 mole % diol residues. Thus, there are 30 moles of 1,4-cyclohexanedimethanol residues among every 100 moles of diol residues.

The copolyesters comprise 70 to 100 mole % of an aromatic diacid. In one embodiment, the copolyesters comprise 70 to 100 mole % of terephthalic acid (TPA). Alternatively, the copolyesters comprise 80 to 100 mole % TPA, or 90 to 100 mole % TPA or 95 to 100 mole % TPA or 100 mole % TPA. For the purposes of this disclosure, the terms "terephthalic acid" and "dimethyl terephthalate" are used interchangeably herein.

In addition to terephthalic acid, the dicarboxylic acid component of the copolyester useful in the invention can comprise up to 30 mole %, up to 20 mole %, up to 10 mole %, up to 5 mole %, or up to 1 mole % of one or more modifying aromatic dicarboxylic acids. Yet another embodiment contains 0 mole % modifying aromatic dicarboxylic acids. Thus, if present, it is contemplated that the amount of one or more modifying aromatic dicarboxylic acids can range from any of these preceding endpoint values including, for example, from 0.01 to 30 mole %, 0.01 to 20 mole %, from 0.01 to 10 mole %, from 0.01 to 5 mole % and from 0.01 to 1 mole. In one embodiment, modifying aromatic dicarboxylic acids that may be used in the present invention include but are not limited to those having up to 20 carbon atoms, and which can be linear, para-oriented, or symmetrical. Examples of modifying aromatic dicarboxylic acids which may be used in this invention include, but are not limited to, isophthalic acid, 4,4'-biphenyldicarboxylic acid, 1,4-, 1,5-, 2,6-, 2,7-naphthalenedicarboxylic acid, and trans-4,4'-stilbenedicarboxylic acid, and esters thereof. In one embodiment, the modifying aromatic dicarboxylic acid is isophthalic acid.

The carboxylic acid component of the copolyesters useful in the invention can be further modified with up to 10 mole %, such as up to 5 mole % or up to 1 mole % of one or more aliphatic dicarboxylic acids containing 2-16 carbon atoms, such as, for example, malonic, succinic, glutaric, adipic, pimelic, suberic, azelaic and dodecanedioic dicarboxylic acids. Certain embodiments can also comprise 0.01 or more mole %, such as 0.1 or more mole %, 1 or more mole %, 5 or more mole %, or 10 or more mole % of one or more modifying aliphatic dicarboxylic acids. Yet another embodiment contains 0 mole % modifying aliphatic dicarboxylic acids. Thus, if present, it is contemplated that the amount of one or more modifying aliphatic dicarboxylic acids can range from any of these preceding endpoint values including, for example, from 0.01 to 10 mole % and from 0.1 to 10 mole %. The total mole % of the dicarboxylic acid component is 100 mole %.

Esters of terephthalic acid and the other modifying dicarboxylic acids or their corresponding esters and/or salts may be used instead of the dicarboxylic acids. Suitable examples of dicarboxylic acid esters include, but are not limited to, the dimethyl, diethyl, dipropyl, diisopropyl, dibutyl, and diphenyl esters. In one embodiment, the esters are chosen from at least one of the following: methyl, ethyl, propyl, isopropyl, and phenyl esters.

The copolyesters useful in the copolyesters compositions of the invention can comprise from 0 to 10 mole percent, for example, from 0.01 to 5 mole percent, from 0.01 to 1 mole percent, from 0.05 to 5 mole percent, from 0.05 to 1 mole percent, or from 0.1 to 0.7 mole percent, based the total mole percentages of either the diol or diacid residues; respectively, of one or more residues of a branching monomer, also referred to herein as a branching agent, having 3 or more carboxyl substituents, hydroxyl substituents, or a combination thereof. In certain embodiments, the branching monomer or agent may be added prior to and/or during and/or after the polymerization of the polyester. The copolyester(s) useful in the invention can thus be linear or branched.

Examples of branching monomers include, but are not limited to, multifunctional acids or multifunctional alcohols such as trimellitic acid, trimellitic anhydride, pyromellitic dianhydride, trimethylolpropane, glycerol, pentaerythritol, citric acid, tartaric acid, 3-hydroxyglutaric acid and the like. In one embodiment, the branching monomer residues can comprise 0.1 to 0.7 mole percent of one or more residues chosen from at least one of the following: trimellitic anhydride, pyromellitic dianhydride, glycerol, sorbitol, 1,2,6-hexanetriol, pentaerythritol, trimethylolethane, and/or trimesic acid. The branching monomer may be added to the polyester reaction mixture or blended with the polyester in the form of a concentrate as described, for example, in U.S. Pat. Nos. 5,654,347 and 5,696,176, whose disclosure regarding branching monomers is incorporated herein by reference.

All of the following embodiments of copolyesters are useful in all of the embodiments of the present invention. In certain embodiments the glycol component of the copolyester comprises ethylene glycol and 1,4-cyclohexanedimethanol. In one embodiment the glycol component of the copolyester comprises 1 to 65 mole % 1,4-cyclohexanedimethanol and 35 to 99 mole % ethylene glycol. In one embodiment the glycol component of the copolyester comprises 1 to 50 mole % 1,4-cyclohexanedimethanol and 50 to 99 mole % ethylene glycol. In one embodiment the glycol component of the copolyester comprises about 1 to 31 mole % 1,4-cyclohexanedimethanol and about 69 to 99 mole % ethylene glycol. In one embodiment the glycol component of the copolyester comprises about 31 mole % 1,4-cyclohexanedimethanol and about 69 mole % ethylene glycol. In one embodiment the glycol component of the copolyester comprises about 5 to 65 mole % 1,4-cyclohexanedimethanol and about 35 to 95 mole % ethylene glycol. In one embodiment the glycol component of the copolyester comprises about 5 to 50 mole % 1,4-cyclohexanedimethanol and about 50 to 95 mole % ethylene glycol. In one embodiment the glycol component of the copolyester comprises about 10 to 65 mole % 1,4-cyclohexanedimethanol and about 35 to 90 mole % ethylene glycol. In one embodiment the glycol component of the copolyester comprises about 10 to 50 mole % 1,4-cyclohexanedimethanol and about 50 to 90 mole % ethylene glycol. In one embodiment the glycol component of the copolyester comprises about 20 to 65 mole % 1,4-cyclohexanedimethanol and about 35 to 80 mole % ethylene glycol. In one embodiment the glycol component of the copolyester comprises about 20 to 50 mole % 1,4-cyclohexanedimethanol and about 50 to 80 mole % ethylene glycol. In one embodiment the glycol component of the copolyester comprises about 30 to 65 mole % 1,4-cyclohexanedimethanol and about 35 to 70 mole % ethylene glycol. In one embodiment the glycol component of the copolyester comprises about 30 to 50 mole % 1,4-cyclohexanedimethanol and about 50 to 70 mole % ethylene glycol.

The 1,4-cyclohexanedimethanol may be cis, trans, or a mixture thereof, for example a cis/trans ratio of 60:40 to 40:60. In another embodiment, the trans-1,4-cyclohexanedimethanol can be present in an amount of 60 to 80 mole %. Alternatively, 1,2- and/or 1-3-cyclohexanedimethanol may be used individually or in combination with each other and/or 1,4-cyclohexanedimethanol.

The glycol component of the copolyester portion of the copolyester composition useful in all of the embodiments of the invention can contain 25 mole % or less of one or more modifying glycols which are not ethylene glycol or 1,4-cyclohexanedimethanol; in one embodiment, the copolyesters useful in the invention may contain less than 15 mole % of one or more modifying glycols. In another embodiment, the copolyesters useful in the invention can contain 10 mole % or less of one or more modifying glycols. In another embodiment, the copolyesters useful in the invention can contain 5 mole % or less of one or more modifying glycols. In another embodiment, the copolyesters useful in the invention can contain 3 mole % or less of one or more modifying glycols. In another embodiment, the copolyesters useful in the invention can contain 0 mole % modifying glycols. Certain embodiments can also contain 0.01 or more mole %, such as 0.1 or more mole %, 1 or more mole %, 5 or more mole %, or 10 or more mole % of one or more modifying glycols. Thus, if present, it is contemplated that the amount of one or more modifying glycols can range from any of these preceding endpoint values including, for example, from 0.01 to 15 mole % and from 0.1 to 10 mole %.

Modifying glycols useful in the copolyesters useful in all embodiments of the invention refer to diols other than ethylene glycol and 1,4-cyclohexanedimethanol and may contain 2 to 16 carbon atoms. Examples of suitable modifying glycols include, but are not limited to, 1,2-propanediol, 1,3-propanediol, neopentyl glycol, 1,4-butanediol, 1,5-pentanediol, 1,6-hexanediol, p-xylene glycol, 2,2,4,4-tetramethylcyclobutane-1,3-diol or mixtures thereof. In another embodiment, the modifying glycols are 1,3-propanediol and/or 1,4-butanediol.

The first of the two flame retardant materials is from the nitrogen containing class of flame retardants known as melamines. This class of materials includes, but is not limited to, melamine cyanurate, melamine polyphosphate, and melamine phosphate. These melamines are available from BASF/Ciba under the 'Melapur' trade name.

The second flame retardant material is from a class of materials known as metal phosphinates. This class of materials includes, but is not limited to, aluminum phosphinate or zinc phosphinate. These metal phosphinates are available in a variety of forms from Clariant under the Exolit trade name.

Although the combination of the two classes of flame retardants to improve flame retardancy has been suggested, the present invention uses unexpectedly low levels of the flame retardants in the copolyester to achieve a flame retardant copolyester composition. (Flame Retardancy Mechanisms of metal phosphinates and metal phosphinates in combination with melamine cyanurate in glass-fiber reinforced poly(1,4-butylene terephthalate), Ulrike, B Schartel, B. Macromolecular Materials and Engineering, 200, 293, pp. 206-217). The disclosures of Clariant and BASF/Ciba exemplified the use of higher levels, based on the amount of polymer, of the combined flame retardants. Clariant provided two examples, 30% glass fiber filled reinforced Nylon 66 composition and a 30% glass fiber filled polybutyleneterephthalate (PBT) composition. In the Nylon 66 comparison, a flame retardant level of 16% was needed to achieve a UL 94 V0 rating. Since the Nylon 66 formulation was 30% filled with glass fiber, the effective percentage of flame retardant in the formulation was 23%. In the PBT composition, a flame retardant level of 20% was needed to achieve a UL 94 V0 rating. In this case, the effective percentage of flame retardant in the formulation was 29% to achieve a UL 94 V0 rating.

By contrast, certain embodiments of the present invention use 5% of melamine cyanurate and 5% aluminum phosphinate and 90% copolyester to achieve a combination of a UL 94 V0 rating while maintaining ductile puncture resistance (Instrumented Impact ASTM D3763) greater than 8 Joules. This 10% flame retardant loading, based on the weight of the copolyester, is much lower than the above mentioned Clariant and BASF/Ciba examples using Nylon 66 and PBT. Additionally, there are ranges of flame retardant levels and combinations that either maintain a UL 94 V0 rating or impact properties, but not both properties. Compositions with 2.5% aluminum phosphinate/2.5% melamine cyanurate or 2.5% aluminum phosphinate/5% melamine cyanurate retained puncture resistance but did not achieve a UL 94 V0 rating. Compositions with 5% aluminum phosphinate/10% melamine cyanurate and 10% aluminum phosphinate/5% melamine cyanurate both achieved a UL 94 V0 rating but both compositions had brittle failures in puncture resistance (Instrumented Impact ASTM D3763). The present invention is the unexpected discovery of a range between 7.5% flame retardant loading and 15% flame retardant loading that will result in a combination of UL 94 V0 and retention of puncture resistance.

In one aspect, the copolyester compositions of the present invention useful for meeting the UL 94 V0 rating and energy at maximum load of at least 8 Joules comprise from greater than 7.5 to less than 15 weight % of a flame retardant mixture comprising a melamine and a metal phosphinate. In one aspect, the copolyester compositions of the present invention comprise from greater than 8 to less than 15 weight % or 9 to 13 weight % of a flame retardant mixture comprising a melamine and a metal phosphinate, wherein the weight % is based on the weight of the copolyester.

The specific ranges of flame retardant mixture described are useful in all embodiments of the copolyester composition of the present invention useful for meeting the UL 94 V0 rating and energy at maximum load of at least 8 Joules. In one embodiment, the flame retardant mixture, comprising a mixture of a melamine and a metal phosphinate, ranges from greater than 7.5 to less than 15 weight % or from greater than 7.5 to about 14 weight % or from greater than 7.5 to about 13 weight % or from greater than 7.5 to about 12 weight % or from greater than 7.5 to about 11 weight % or from greater than 7.5 to about 10 weight % or from greater than 7.5 to about 9 weight % or from greater than 7.5 to about 8 weight %, wherein the weight % is based on the weight of the copolyester. In another embodiment, the flame retardant mixture, comprising a mixture of a melamine and a metal phosphinate, ranges from about 8 to less than 15 weight % or from about 8 to about 14 weight % or from about 8 to about 13 weight % or from about 8 to about 12 weight % or from about 8 to about 11 weight % or from about 8 to about 10 weight % or from about 8 to about 9 weight %, wherein the weight % is based on the weight of the copolyester. In another embodiment, the flame retardant mixture, comprising a mixture of a melamine and a metal phosphinate, ranges from about 9 to less than 15 weight % or from about 9 to about 14 weight % or from about 9 to about 13 weight % or from about 9 to about 12 weight % or from about 9 to about 11 weight % or from about 9 to about 10 weight %, wherein the weight % is based on the weight of the copolyester. In another embodiment, the flame retardant mixture, comprising a mixture of a melamine and a metal phosphinate, ranges from about 10 to less than 15 weight % or from about 10 to about 14 weight % or from about 10 to about 13 weight % or from about 10 to about 12 weight % or from about 10 to about 11 weight %, wherein the weight % is based on the weight of the copolyester. In another embodiment, the flame retardant mixture, comprising a mixture of a melamine and a metal phosphinate, ranges from about 11 to less than 15 weight % or from about 11 to about 14 weight % or from about 11 to about 13 weight % or from about 11 to about 12 weight %, wherein the weight % is based on the weight of the copolyester. In another embodiment, the flame retardant mixture, comprising a mixture of a melamine and a metal phosphinate, ranges from about 12 to less than 15 weight % or from about 12 to about 14 weight % or from about 12 to about 13 weight %, wherein the weight % is based on the weight of the copolyester. In another embodiment, the flame retardant mixture, comprising a mixture of a melamine and a metal phosphinate, ranges from about 13 to less than 15 weight % or from about 1 to about 14 weight %, wherein the weight % is based on the weight of the copolyester. In another embodiment, the flame retardant mixture, comprising a mixture of a melamine and a metal phosphinate, ranges from about 14 to less than 15 weight %, wherein the weight % is based on the weight of the copolyester.

In certain embodiments of the present invention, the occurrence of flaming droplets in the copolyesters is reduced or eliminated in copolyester compositions with 2.5 weight % aluminum phosphinate and 2.5 weight % melamine cyanurate or 2.5 weight % aluminum phosphinate and 5 weight % melamine cyanurate which resulted in a UL 94 V2 rating. Certain embodiments of the present invention comprise a copolyester composition comprising any of the copolyesters described above and a combination of flame retardants comprising less than 5 weight % melamine and 5 weight % metal phosphinate and from 0.5 to 2.0 weight % of a drip suppressant. The drip suppressant comprises a fluoropolymer. Certain embodiments of the present invention comprise a copolyester composition comprising any of the copolyesters described above and a combination of flame retardants comprising less than 7.5 weight % of a combination of a melamine and a metal phosphinate and from 0.5 to 2.0 weight % of a drip suppressant wherein the copolyester composition has a UL 94 V0 rating. Certain embodiments of the present invention comprise a copolyester composition comprising any of the copolyesters described above and a combination of flame retardants comprising less than about 2.5 weight % of a combination of a melamine and a metal phosphinate and from 0.5 to 2.0 weight % of a drip suppressant wherein the copolyester composition has a UL 94 V0 rating. The drip suppressant comprises a fluoropolymer. The fluoropolymer includes, but is not limited to, Teflon™.

Furthermore, it has been discovered that very low amounts of the two flame retardant additives (compared to amounts of flame retardants typically reported in flame retarded polymers and plastics, as discussed above for use levels in Nylon 66 and PBT) can be used to achieve a Class A or Class 1 rating per various building codes when tested according to ASTM E-84. Samples of SPECTAR™ 14471 copolyester and PROVISTA NXT (both from Eastman Chemical Company in Kingsport, Tenn., USA) were compounded with various loadings of melamine cyanurate including but not limited to Melapur MC 25 from Ciba/BASF and aluminum phosphinate including but not limited to Exolit OP 1240 from Clariant. Formulations of 90% PETG/5% melamine cyanurate/5% aluminum phosphinate were adhered to both cement board and gypsum board and achieved a Class A or Class 1 rating per various building codes when tested according to ASTM E-84. Formulations of 96% PETG/2% melamine cyanurate/2% aluminum phosphinate were adhered to cement board and achieved a Class A or Class 1 rating when tested according to ASTM E-84. Formulations of a 96% PROVISTA NXT/2% melamine cyanurate/2% aluminum phosphinate were tested according to a modified ASTM E-84 test (instead of being adhered to a substrate, samples were tested in a 10 inch wide strip, 24 feet long and supported by a wire mesh) and achieved a Class A or Class 1 rating per various building codes.

Class A or Class 1 flammability rating requires a flame spread index (FSI) of 25 or less and a smoke developed index (SDI) of 450 or less. The formulation of 96% PETG/2% melamine cyanurate/2% aluminum phosphinate achieved a 15 FSI and a 250 SDI when adhered to cement board and the formulation of 96% PETG modified with TMA/2% melamine cyanurate/2% aluminum phosphinate achieved a 5 FSI and a 250 SDI. The range of formulas from 90% PETG/5% melamine cyanurate/5% aluminum phosphinate and lower flame retardant ingredient concentrations to 96% PETG/2% melamine cyanurate/2% aluminum phosphinate meet a Class A or Class 1 rating. In one embodiment of the present invention, the FSI and SDI results indicate that it may be possible to meet a Class A or Class 1 rating with lower flame retardant ingredient concentrations, down to a 98% PETG/1% melamine cyanurate/1% aluminum phosphinate formulation.

The following specific ranges of flame retardant mixture described are also useful in all embodiments of the copolyester composition of the present invention useful for meeting the ASTM E-84 rating and energy at maximum load of at least 8 Joules. In one embodiment, the flame retardant mixture, comprising a mixture of a melamine and a metal phosphinate, ranges from greater than 2 to less than 10 weight % or from greater than 2 to about 9 weight % or from greater than 2 to about 8 weight % or from greater than 2 to about 7 weight % or from greater than 2 to about 6 weight % or from greater than 2 to about 5 weight % or from greater than 2 to about 4 weight % or from greater than 2 to about 3 weight %, wherein the weight % is based on the weight of the copolyester. In another embodiment, the flame retardant mixture, comprising a mixture of a melamine and a metal phosphinate, ranges from about 3 to less than 10 weight % or from about 3 to about 9 weight % or from about 3 to about 8 weight % or from about 3 to about 7 weight % or from about 3 to about 6 weight % or from about 3 to about 5 weight % or from about 3 to about 4 weight %, wherein the weight % is based on the weight of the copolyester. In another embodiment, the flame retardant mixture, comprising a mixture of a melamine and a metal phosphinate, ranges from about 4 to less than 10 weight % or from about 4 to about 9 weight % or from about 4 to about 8 weight % or from about 4 to about 7 weight % or from about 4 to about 6 weight % or from about 4 to about 5 weight %, wherein the weight % is based on the weight of the copolyester.

Notched Izod impact strength, as described in ASTM D256, is a common method of measuring toughness. When tested by the Izod method, polymers can exhibit either a complete break failure mode, where the test specimen breaks into two distinct parts, or a partial or no break failure mode, where the test specimen remains as one part. The complete break failure mode is associated with low energy failure. The partial and no break failure modes are associated with high energy failure.

The copolyester compositions useful in the invention can possess one or more of the following properties. In one embodiment, the copolyester compositions useful in the invention exhibit, as shown by puncture resistance, a instrumented energy at maximum load of about 14 J at 23° C. with a 100 mm×100 mm×1.5 mm plaque thick bar determined according to ASTM D3763; in one embodiment, the copolyester compositions useful in the invention exhibit a instrumented energy at maximum load of at about 8.0 J at 23° C. with a 100 mm×100 mm×1.5 mm plaque thick bar determined according to ASTM D3763; in one embodiment, the copolyester compositions useful in the invention exhibit a instrumented energy at maximum load of greater than 7.0 J at 23° C. with a 100 mm×100 mm×1.5 mm plaque thick bar determined according to ASTM D3763.

The melamine cyanurate/aluminum phosphinate combination did decrease the notched Izod impact strength of the copolyester compared to the copolyester without the flame retardants. Certain embodiments of the present invention comprise an impact modifier to improve the notched Izod impact strength of the copolyester compositions The impact modifiers comprise plastics and/or elastomers including, but not limited to, Acrylonitrile Butadiene Styrene (ABS), Methyl Methacrylate Butadiene Styrene (MBS), Acrylic (Butyl Acrylate Methyl Acrylate), Copolyester Ether copolymer (COPE, Trade name ECDEL, from Eastman Chemical Company), Ethylene Methacrylate Copolymer (EMAC), Aliphatic Aromatic Copolyester (Trade name EASTAR BIO, from Eastman Chemical Company), and reactive Acrylic (Ethylene Acrylic Ester Glycidyl Methacrylate).

The polyester portion of the copolyester compositions useful in the invention can be made by processes known from the literature such as, for example, by processes in homogenous solution, by transesterification processes in the melt, and by two phase interfacial processes. Suitable methods include, but are not limited to, the steps of reacting one or more dicarboxylic acids with one or more glycols at a temperature of 100° C. to 315° C. at a pressure of 0.1 to 760 mm Hg for a time sufficient to form a copolyester. See U.S. Pat. No. 3,772,405 for methods of producing copolyesters, the disclosure regarding such methods is hereby incorporated herein by reference.

In another aspect, the invention relates to films or sheets comprising a copolyester produced by a process comprising:

(I) heating a mixture comprising the monomers useful in any of the copolyesters in the invention in the presence of a catalyst at a temperature of 150 to 240° C. for a time sufficient to produce an initial copolyester;

(II) heating the initial copolyester of step (I) at a temperature of 240 to 320° C. for 1 to 4 hours; and (III) removing any unreacted glycols.

Suitable catalysts for use in this process include, but are not limited to, organo-zinc or tin compounds. The use of this type of catalyst is well known in the art. Examples of catalysts useful in the present invention include, but are not limited to, zinc acetate, butyltin tris-2-ethylhexanoate, dibutyltin diacetate, and dibutyltin oxide. Other catalysts may include, but are not limited to, those based on titanium, zinc, manganese, lithium, germanium, and cobalt. Catalyst amounts can range from 10 ppm to 20,000 ppm or 10 to 10,000 ppm, or 10 to 5000 ppm or 10 to 1000 ppm or 10 to 500 ppm, or 10 to 300 ppm or 10 to 250 based on the catalyst metal and based on the weight of the final polymer. The process can be carried out in either a batch or continuous process.

Typically, step (I) can be carried out until 50% by weight or more of the glycol has been reacted. Step (I) may be carried out under pressure, ranging from atmospheric pressure to 100 psig. The term "reaction product" as used in connection with any of the catalysts useful in the invention refers to any product of a polycondensation or esterification reaction with the catalyst and any of the monomers used in making the polyester as well as the product of a polycondensation or esterification reaction between the catalyst and any other type of additive.

Typically, Step (II) and Step (III) can be conducted at the same time. These steps can be carried out by methods known in the art such as by placing the reaction mixture under a pressure ranging from 0.002 psig to below atmospheric pressure, or by blowing hot nitrogen gas over the mixture.

In certain embodiments, a copolyester concentrate comprises the copolyester and a combination of flame retardants comprising a melamine and a metal phosphinate wherein the flame retardants comprise more than 15 weight % of the copolyester concentrate based on the total weight of the copolyester concentrate. The combination of flame retardants in the concentrate comprises more than 20 weight % or more than 30 weight % or more than 40 weight % or more than 50 weight % or more than 60 weight % or more than 70 weight % or more than 80 weight % or more than 90 weight % of the copolyester concentrate based on the total weight of the concentrate.

The flame retardant materials can be incorporated into the copolyester in a concentrate form in a number of ways for ultimate formation into an article.

The flame retardants are incorporated singly or together in a plastics compounding line such as a twin screw compounding line to form a copolyester composition concentrate. In this case copolyester pellets are dried for 4 to 6 hours at 150° to 160° F. to reduce moisture. The pellets are then fed into the throat of the extruder and melted from 430° to 520° F. to produce a viscous thermoplastic material. Alternatively, the flame retardants are pre-blended and added as a single powder with a loss-in-weight feeder or added singly in a loss in weight feeder. The rotation of the two screws disperses the flame retardants into the copolyester. The mixture is then extruded through a die to produce multiple strands. In certain embodiments, the strands are fed through a water trough to cool the pellets. Upon exiting the water trough, the strands are dried and fed into a dicer to cut the strands into pellets. Alternatively, the mixture can be extruded through a circular flat plate die with multiple openings into water. The flat plate die has a rotating cutter that slices the strands as they extrude from the die to produce pellets. The continuous flow of water cools the pellets and transports them to a drying section, typically a centrifuge to separate the pellets from the water.

Alternatively, the flame retardants are incorporated singly or together in a plastics compounding line such as a two-rotor continuous compounding mixer (such as a Farrell Continuous Mixer) to form a copolyester composition concentrate. In this case copolyester pellets are dried for 4 to 6 hours at 150° to 160° F. to reduce moisture. The copolyester pellets and the flame retardants are fed into the throat of the continuous mixer and melted into a homogenous mixture at 430° to 520° F. The output rate of the mixer is controlled by varying the area of a discharge orifice. The melt can be sliced off into 'loaves' and fed to a two roll mill or the throat of a single screw extruder. In the case of the melt being fed to a two-roll mill, the melt covers one of the rolls to form a sheet of the concentrate which is cut into strips which are fed to the throat of a single screw extruder. The mixture is then extruded through a die to produce multiple strands. The strands are fed through a water trough to cool the pellets. Upon exiting the water trough, the strands are dried and fed into a dicer to cut the strands into pellets. Alternatively, the mixture can be extruded through a circular flat plate die with multiple openings into water. The flat plate die has a rotating cutter that slices the strands as they extrude from the die to produce pellets. The continuous flow of water cools the pellets and transports them to a drying section, typically a centrifuge to separate the pellets from the water. In the case of the 'loaves' (relatively large portions of the concentrate) being fed to a single screw extruder, the mixture is extruded through a die to produce multiple strands. The strands can be fed through a water trough to cool the pellets. Upon exiting the water trough, the strands are dried and fed into a dicer to cut the strands into pellets. Alternatively, the mixture can be extruded through a circular flat plate die with multiple openings into water. The flat plate die has a rotating cutter that slices the strands as they extrude from the die to produce pellets. The continuous flow of water cools the pellets and transports them to a drying section, typically a centrifuge to separate the pellets from the water.

Alternatively, the flame retardants are incorporated singly or together in a high-intensity mixer such a Banbury® batch type mixer to form a copolyester composition concentrate. In this case, the copolyester pellets can be dried for 4 to 6 hours at 150 to 160 F to reduce moisture. The copolyester pellets and the flame retardants are charged into a high-intensity mixer and a ram lowered to compress the pellet/flame retardants mixture into the mixing chamber. Two rotating mixer blades melt the pellets and disperse the flame retardants into the melt. When the desired temperature is reached, a door is opened in the bottom of the mixer and the mixture is dropped two a two roll mill. A ribbon from the two roll mill can then be fed to a single screw extruder. The mixture is then extruded through a die to produce multiple strands. The strands can be fed through a water trough to cool the pellets. Upon exiting the water trough, the strands are dried and fed into a dicer to cut the strands into pellets. Alternatively, the mixture can be extruded through a circular flat plate die with multiple openings into water. The flat plate die has a rotating cutter that slices the strands as they extrude from the die to produce pellets. The continuous flow of water cools the pellets and transports them to a drying section, typically a centrifuge to separate the pellets from the water.

Films and/or sheets useful in the present invention can be of any thickness which would be apparent to one of ordinary skill in the art. In one embodiment, the films(s) of the invention have a thickness of less than 30 mils or less than 20 mils or less than 10 mils or less than 5 mils. In one embodiment, the sheets of the invention have a thickness of no less than 30 mils. In one embodiment, the sheets of the invention have a thickness of from 30 mils to 100 mils or from 30 mils to 200 mils or from 3 mils to 500 mils.

The invention further relates to the films and/or sheets comprising the polyester compositions of the invention. The methods of forming the polyesters into films and/or sheets are well known in the art. Examples of films and/or sheets of the invention include, but are not limited to, extruded films and/or sheets, calendered films and/or sheets, compression molded films and/or sheets, injection molded films or sheets, and solution casted films and/or sheets. Methods of making film and/or sheet include but are not limited to extrusion, calendering, extrusion molding, compression molding, and solution casting. These films or sheets may be made or subjected to further processing such as orientation (uniaxial or biaxial), heat setting, surface treatment, etc.

The present invention includes plastic articles comprising the copolyester compositions. The plastic articles may be made by processes comprising, but not limited to, extrusion of the copolyester composition to produce a continuous flat sheet or profile or injection molding to create discrete articles or calendering to produce a continuous film or sheet.

In one embodiment of the invention comprises a flat sheet or profile. The sheet or profile is prepared by extruding the copolyester composition to produce a flat sheet or profile. In this case, pellets of the copolyester composition are dried at 150° to 160° F. for 4 to 6 hours and are then fed to either a single screw extruder, a twin-screw extruder, or a conical twin screw extruder. The copolyester composition pellets are conveyed and compressed by the screw(s) down the extruder barrel to melt the pellets and discharge the melt from the end of the extruder. The melt is fed through a screening device to remove debris and/or a melt pump to reduce pressure variations caused by the extruder. The melt is then fed through a die to create a continuous flat sheet or into a profile die to create a continuous shape. In one embodiment of the invention comprising a flat sheet die, the melt is extruded onto a series of metal rolls, typically three, to cool the melt and impart a finish onto the sheet. The flat sheet is then conveyed in a continuous sheet for a distance or period of time sufficient to cool the sheet. The sheet is then trimmed to the desired width and then either rolled up into a roll or sheared or sawed into sheet form of desired dimensions. A flat sheet can also be formed into a shaped article through mechanical means to form a desired shaped article and then cooled either by spraying with water, by conveying through a water trough or by blowing air on the shaped article. The article then sawed or sheared to the desired length. In the case of a profile die, the die is designed to produce the desired shape of the profile. After exiting the die, the profile is then cooled either by spraying with water, by conveying through a water trough or by blowing air on the profile. The profile is then sawed or sheared to the desired length.

Another embodiment of the invention comprises mixing neat copolyester pellets with a concentrate of flame retardants and then extruding the copolyester composition. The flame retardant concentrate can be compounded as a single pellet or as two separate pellets containing either melamine cyanurate or aluminum phosphinate so that the ratio of the flame retardants ingredients can be varied if desired. The pellets are dried at 150 to 160 F for 4 to 6 hours before extrusion. The pellets are dried separately or together after being blended in a low-intensity mixer such as a ribbon blender, a tumbler, or conical screw blender. The pellets are then fed to an extruder including, but not limited to, a single screw extruder, a twin-screw extruder, or a conical twin screw extruder. The pellets are conveyed and compressed by the screw(s) down the extruder barrel to melt the pellets and discharge the melt from the end of the extruder. The melt is typically fed through a screening device to remove debris and/or a melt pump to reduce pressure variations caused by the extruder. The melt is then fed through a die to create a continuous flat sheet or into a profile die to create a continuous shape. In the case of the flat sheet die, the melt is extruded onto a series of metal rolls, typically three, to cool the melt and impart a finish onto the sheet. The flat sheet is then conveyed in a continuous sheet for a distance or period of time sufficient to cool the sheet. It can then be trimmed to the desired width and then either rolled up into a roll or sheared or sawed into sheet form. A flat sheet can also be formed into a shape through mechanical means to form a desired shape and then cooled either by spraying with water, through a water trough or by blowing air on the shaped article. It can then be sawed or sheared to the desired length. In the case of a film, the film may be produced and wound into a roll. In the case of a profile die, the die is designed to produce the desired shape of the article. After exiting the die, the profile can then be cooled either by spraying with water, through a water trough or by blowing air on the profile. It can then be sawed or sheared to the desired length.

Another embodiment of the invention comprises extruding pellets of the copolyester composition, comprising the copolyester and flame retardants, to produce an injection molded article. In this case, the pellets are dried at 150° to 160° F. for 4 to 6 hours to dry the pellets which are then fed to a reciprocating single screw extruder. The pellets are melted by the screw rotation and reciprocating action. Once the pellets reach the desired temperature, a gate is opened at the end of the extruder and the melted plastic is pumped by the screw into a heated mold to form an article of the desired shape. Once the mold is filled, a coolant is pumped through the mold to cool it and the melted plastic. Once the plastic has solidified, the mold is opened and the article is removed from the mold.

Another embodiment of the invention comprises mixing neat copolyester pellets with a concentrate of a mixture of two flame retardants to form the copolyester composition and then extruding the copolyester composition to produce an injection molded article. The flame retardant concentrate can be compounded, with the copolyester, as a single pellet or as two separate pellets containing either melamine cyanurate or aluminum phosphinate to provide the desired ratio of the flame retardants in the copolyester composition. The pellets are dried at 150° to 160° F. for 4 to 6 hours and are then fed to a reciprocating single screw extruder. The pellets can be dried separately or together after being blended in a low-intensity mixer including, but not limited to, a ribbon blender, a tumbler, or conical screw blender. Once the pellets reach the desired temperature, a gate is opened at the end of the extruder and the melted plastic is pumped by the screw into a heated mold to form an article of the desired shape. Once the mold is filled, a coolant is pumped through the mold to cool it and the melted plastic. Once the plastic has solidified, the mold is opened and the article is removed from the mold.

Another embodiment of the invention comprises mixing neat copolyester pellets with a concentrate of flame retardants to form the copolyester composition and then calendering the copolyester composition to produce a film product. Calendering is a well-known process of forming a film or sheet through successive co-rotating parallel rollers. In the calendering process, the pellets do not need to be pre-dried as the processing temperatures are low enough (350° to 400° F.) so degradation and hydrolysis of the polyester does not occur in a significant amount. The flame retardants can alternatively be mixed, with the copolyester, as a single pellet containing both melamine cyanurate and aluminum phosphinate or as two separate pellets containing melamine cyanurate or aluminum phosphinate in order to vary the ratio of the flame retardants. Alternatively, the flame retardants (in powder form) and copolyester pellets can be mixed together at the mixer feeding the calender without a pre-compounded pellet of the copolyester composition. The copolyester composition may be melted by using a high intensity mixer or extruder, including but not limited to, Buss Ko-kneader, a planetary gear extruder, Farrell continuous mixer, a twin screw extruder, or a Banbury® type mixer. The melt is then conveyed to the calender. A calender typically consists essentially of a system of three or more large diameter heated rollers which convert high viscosity plastic into a film or sheet. The flat sheet or film is conveyed in a continuous web to cool the sheet. It can then be trimmed to the desired width and then either rolled up into a roll or sheared or sawed into sheet form.

Although the copolyester composition may be prepared by mixing or blending a concentrate of flame retardants and copolyester, the copolyester composition may alternatively be prepared by blending the flame retardants directly with the copolyester, using any of the mixing or blending processed previously described for making the copolyester composition by blending the flame retardant concentrate and the copolyester. The two flame retardants may be mixed or blended with the copolyester simultaneously or sequentially.

Other embodiments of the present invention are presented below.

Item 1. A copolyester composition comprising:
   (a) from greater than 85 to about 98 weight % copolyester, the copolyester comprising
      (i) a diacid component comprising
         from 70 to 100 mole % residues of terephthalic acid and from 0 to 30 mole % residues of a modifying aromatic diacid having from 8 to 12 carbon atoms, and
      (ii) a glycol component comprising
         1 to 50 mole % cyclohexanedimethanol residues and 50 to 99 mole % of a modifying glycol having 2 to 20 carbon atoms;
   (b) from greater than 2 to less than 15 weight % of a flame retardant mixture comprising (i) a melamine and (ii) a metal phosphinate, wherein the copolyester composition has (1) a UL 94 V0 rating or (2) a Class 1 or Class A rating according to ASTM E-84, wherein the copolyester composition has an energy at maximum load greater than 8 Joules measured on a 100 mm×100 mm×1.5 mm plaque according to ASTM D3763,
   wherein the weight % is based on the weight of the copolyester, and
   wherein the total mole % of the dicarboxylic acid component is 100 mole %, the total mole % of the glycol component is 100 mole %.

Item 2. The copolyester composition of Item 1 wherein the flame retardant mixture ranges from 8 to 14 weight %.

Item 3. The copolyester composition of Item 1 wherein the flame retardant mixture ranges from 9 to 13 weight %.

Item 4. The copolyester composition of Item 1 wherein the flame retardant mixture ranges from 2 to 8 weight %.

Item 5. The copolyester composition of Item 1 wherein the flame retardant mixture ranges from 2 to 4 weight %.

Item 6. The copolyester composition of Item 1 wherein the melamine comprises a melamine isocyanurate, a melamine polyphosphate, a melamine phosphate or a mixture thereof.

Item 7. The copolyester composition of Item 1 wherein the metal phosphinate comprises an aluminum phosphinate, a zinc phosphinate or a mixture thereof.

Item 8. The copolyester composition of Item 1 wherein the flame retardant mixture comprises at least 2.5 weight % of the melamine or the metal phosphinate.

Item 9. The copolyester composition of Item 1 wherein the flame retardant mixture comprises at least 5 weight % of the melamine or the metal phosphinate.

Item 10. The copolyester composition of Item 1 wherein the flame retardant mixture comprises at least 10 weight % of the melamine or the metal phosphinate.

Item 11. The copolyester composition of Item 1 wherein the flame retardant mixture comprises at least 5 weight % of each of the melamine and the metal phosphinate.

Item 12. The copolyester composition of Item 1 copolyester composition has an energy at maximum load greater than about 10 joules as measured on a 100 mm×100 mm×1.5 mm plaque according to ASTM D3763.

Item 13. The copolyester composition of Item 1 copolyester composition has an energy at maximum load greater than about 12 joules as measured on a 100 mm×100 mm×1.5 mm plaque according to ASTM D3763.

Item 14. The copolyester composition of Item 1 copolyester composition has an energy at maximum load greater than about 14 joules as measured on a 100 mm×100 mm×1.5 mm plaque according to ASTM D3763.

Item 15. The copolyester composition of Item 1 wherein the copolyester composition further comprises an impact modifier.

Item 16. The copolyester composition of Item 1 wherein the copolyester composition further comprises an anti-drip agent.

Item 17. The copolyester composition of Item 16 wherein the anti-drip agent comprises a fluoropolymer.

Item 18. A method of making a copolyester composition, the method comprising blending
   (a) from greater than 85 to about 98 weight % of a copolyester comprising
      (i) a diacid component comprising
         from 70 to 100 mole % residues of terephthalic acid and from 0 to 30 mole % residues of a modifying aromatic diacid having from 8 to 12 carbon atoms, and
      (ii) a glycol component comprising
         1 to 50 mole % cyclohexanedimethanol residues and 50 to 99 mole % of a modifying glycol having 2 to 20 carbon atoms; and
   (b) from greater than 2 to less than 15 weight % of a flame retardant mixture comprising a melamine and a metal phosphinate,
   to form the copolyester composition,
   wherein the copolyester composition has (1) a UL 94 V0 rating or (2) a Class 1 or Class A rating according to ASTM E-84,
   wherein the copolyester composition has an energy at maximum load greater than 8 Joules measured on a 100 mm×100 mm×1.5 mm plaque according to ASTM D3763,
   wherein the weight % is based on the weight of the copolyester, and
   wherein the total mole % of the dicarboxylic acid component is 100 mole %, the total mole % of the glycol component is 100 mole %.

Item 19. The method of Item 18 wherein the blending comprises at least one of twin screw compounding, two-rotor continuous compounding, Banbury® batch mixer or a combination thereof.

Item 20. An article comprising a copolyester composition comprising (a) greater than 85 to less than 98 weight % of a copolyester comprising
  (i) a diacid component comprising
    from 70 to 100 mole % residues of terephthalic acid and from 0 to 30 mole % residues of a modifying aromatic diacid having from 8 to 12 carbon atoms, and
  (ii) a glycol component comprising
    1 to 50 mole % cyclohexanedimethanol residues and 50 to 99 mole % of a modifying glycol having 2 to 20 carbon atoms; and
(b) from greater than 2 to less than 15 weight % of a flame retardant mixture consisting of a melamine and a metal phosphinate,
to form the copolyester composition,
wherein the copolyester composition has (1) a UL 94 V0 rating or (2) a Class 1 or Class A rating according to ASTM E-84,
wherein the copolyester composition has an energy at maximum load greater than 8 Joules measured on a 100 mm×100 mm×1.5 mm plaque according to ASTM D3763,
wherein the weight % is based on the weight of the copolyester, and
wherein the total mole % of the dicarboxylic acid component is 100 mole %, the total mole % of the glycol component is 100 mole %.

Item 21. The article of Item 20 produced by extrusion, injection molding, or calendering.

Item 22. The article of Item 20 wherein the article is a film, sheet or profile.

Item 23. A copolyester composition comprising:
(a) from greater than 85 to less than 92.5 weight % copolyester, the copolyester comprising
  (i) a diacid component comprising
    from 70 to 100 mole % residues of terephthalic acid and from 0 to 30 mole % residues of a modifying aromatic diacid having from 8 to 12 carbon atoms, and
  (ii) a glycol component comprising
    1 to 50 mole % cyclohexanedimethanol residues and 50 to 99 mole % of a modifying glycol having 2 to 20 carbon atoms;
(b) from greater than 7.5 to less than 15 weight % of a flame retardant mixture comprising
  (i) a melamine and
  (ii) a metal phosphinate,
wherein the copolyester composition has a UL 94 V0 rating,
wherein the copolyester composition has an energy at maximum load greater than 8 Joules measured on a 100 mm×100 mm×1.5 mm plaque according to ASTM D3763,
wherein the weight % is based on the weight of the copolyester, and
wherein the total mole % of the dicarboxylic acid component is 100 mole % and the total mole % of the glycol component is 100 mole %.

Item 24. The copolyester composition of Item 23 wherein the flame retardant mixture ranges from 8 to 14 weight %.

Item 25. The copolyester composition of Item 23 wherein the flame retardant mixture ranges from 9 to 13 weight %.

Item 26. The copolyester composition of Item 23 wherein the melamine comprises a melamine isocyanurate, a melamine polyphosphate, a melamine phosphate or a mixture thereof.

Item 27. The copolyester composition of Item 23 wherein the metal phosphinate comprises an aluminum phosphinate, a zinc phosphinate or a mixture thereof.

Item 28. The copolyester composition of Item 23 wherein the flame retardant mixture comprises at least 2.5 weight % of the melamine or the metal phosphinate.

Item 29. The copolyester composition of Item 23 wherein the flame retardant mixture comprises at least 5 weight % of the melamine or the metal phosphinate.

Item 30. The copolyester composition of Item 23 wherein the flame retardant mixture comprises at least 10 weight % of the melamine or the metal phosphinate.

Item 31. The copolyester composition of Item 23 wherein the flame retardant mixture comprises at least 5 weight % of each of the melamine and the metal phosphinate.

Item 32. The copolyester composition of Item 23 copolyester composition has an energy at maximum load greater than about 10 joules as measured on a 100 mm×100 mm×1.5 mm plaque according to ASTM D3763.

Item 33. The copolyester composition of Item 23 copolyester composition has an energy at maximum load greater than about 12 joules as measured on a 100 mm×100 mm×1.5 mm plaque according to ASTM D3763.

Item 34. The copolyester composition of Item 23 copolyester composition has an energy at maximum load greater than about 14 joules as measured on a 100 mm×100 mm×1.5 mm plaque according to ASTM D3763.

Item 35. The copolyester composition of Item 23 wherein the copolyester composition further comprises an impact modifier.

Item 36. The copolyester composition of Item 23 wherein the copolyester composition further comprises an anti-drip agent.

Item 37. The copolyester composition of Item 36 wherein the anti-drip agent comprises a fluoropolymer.

Item 38. A method of making a copolyester composition, the method comprising blending
(a) from greater than 85 to less than 92.5 weight % of a copolyester comprising
  (i) a diacid component comprising
    from 70 to 100 mole % residues of terephthalic acid and from 0 to 30 mole % residues of a modifying aromatic diacid having from 8 to 12 carbon atoms, and
  (ii) a glycol component comprising
    1 to 50 mole % cyclohexanedimethanol residues and 50 to 99 mole % of a modifying glycol having 2 to 20 carbon atoms; and
(b) from greater than 7.5 to less than 15 weight % of a flame retardant mixture comprising a melamine and a metal phosphinate, to form the copolyester composition,
  wherein the copolyester composition has a UL 94 V0 rating,
  wherein the copolyester composition has an energy at maximum load greater than 8 Joules measured on a 100 mm×100 mm×1.5 mm plaque according to ASTM D3763,
  wherein the weight % is based on the weight of the copolyester, and
  wherein the total mole % of the dicarboxylic acid component is 100 mole % and the total mole % of the glycol component is 100 mole %.

Item 39. The method of Item 38 wherein the blending comprises at least one of twin screw compounding, two-rotor continuous compounding, Banbury® batch mixer or a combination thereof.

Item 40. An article comprising a copolyester composition comprising (a) greater than 85 to less than 92.5 weight % of a copolyester comprising
   (i) a diacid component comprising
      from 70 to 100 mole % residues of terephthalic acid and from 0 to 30 mole % residues of a modifying aromatic diacid having from 8 to 12 carbon atoms, and
   (ii) a glycol component comprising
      1 to 50 mole % cyclohexanedimethanol residues and
      50 to 99 mole % of a modifying glycol having 2 to 20 carbon atoms; and
(b) from greater than 7.5 to less than 15 weight % of a flame retardant mixture consisting of a melamine and a metal phosphinate,
to form the copolyester composition,
   wherein the copolyester composition has a UL 94 V0 rating,
   wherein the copolyester composition has an energy at maximum load greater than 8 Joules measured on a 100 mm×100 mm×1.5 mm plaque according to ASTM D3763,
   wherein the weight % is based on the weight of the copolyester, and
   wherein the total mole % of the dicarboxylic acid component is 100 mole %, the total mole % of the glycol component is 100 mole %.

Item 41. The article of Item 40 produced by extrusion, injection molding, or calendering.

Item 42. The article of Item 40 wherein the article is a film, sheet or profile.

Item 43. A copolyester composition comprising:
(a) from greater than 90 to about 98 weight % copolyester, the copolyester comprising
   (i) a diacid component comprising
      from 70 to 100 mole % residues of terephthalic acid and from 0 to 30 mole % residues of a modifying aromatic diacid having from 8 to 12 carbon atoms, and
   (ii) a glycol component comprising
      1 to 50 mole % cyclohexanedimethanol residues and
      50 to 99 mole % of a modifying glycol having 2 to 20 carbon atoms;
(b) from greater than 2 to less than 10 weight % of a flame retardant mixture comprising
   (i) a melamine and
   (ii) a metal phosphinate,
wherein the copolyester composition has a Class 1 or Class A rating according to ASTM E-84,
wherein the copolyester composition has an energy at maximum load greater than 8 Joules measured on a 100 mm×100 mm×1.5 mm plaque according to ASTM D3763.
wherein the weight % is based on the weight of the copolyester, and
wherein the total mole % of the dicarboxylic acid component is 100 mole %, the total mole % of the glycol component is 100 mole %.

Item 44. The copolyester composition of Item 43 wherein the flame retardant mixture ranges from 2 to 8 weight %.

Item 45. The copolyester composition of Item 43 wherein the flame retardant mixture ranges from 2 to 4 weight %.

Item 46. The copolyester composition of Item 43 wherein the melamine comprises a melamine isocyanurate, a melamine polyphosphate, a melamine phosphate or a mixture thereof.

Item 47. The copolyester composition of Item 43 wherein the metal phosphinate comprises an aluminum phosphinate, a zinc phosphinate or a mixture thereof.

Item 48. The copolyester composition of Item 43 wherein the flame retardant mixture comprises at least 2.5 weight % of the melamine or the metal phosphinate.

Item 49. The copolyester composition of Item 43 wherein the flame retardant mixture comprises at least 5 weight % of the melamine or the metal phosphinate.

Item 50. The copolyester composition of Item 43 wherein the flame retardant mixture comprises at least 2 weight % of the melamine or the metal phosphinate.

Item 51. The copolyester composition of Item 43 wherein the flame retardant mixture comprises at least 1 weight % of each of the melamine and the metal phosphinate.

Item 52. The copolyester composition of Item 43 copolyester composition has an energy at maximum load greater than about 10 joules as measured on a 100 mm×100 mm×1.5 mm plaque according to ASTM D3763.

Item 53. The copolyester composition of Item 43 copolyester composition has an energy at maximum load greater than about 12 joules as measured on a 100 mm×100 mm×1.5 mm plaque according to ASTM D3763.

Item 54. The copolyester composition of Item 43 copolyester composition has an energy at maximum load greater than about 14 joules as measured on a 100 mm×100 mm×1.5 mm plaque according to ASTM D3763.

Item 55. The copolyester composition of Item 43 wherein the copolyester composition further comprises an impact modifier.

Item 56. The copolyester composition of Item 43 wherein the copolyester composition further comprises an anti-drip agent.

Item 57. The copolyester composition of Item 56 wherein the anti-drip agent comprises a fluoropolymer.

Item 58. A method of making a copolyester composition, the method comprising blending
(a) from greater than 90 to about 98 weight % of a copolyester comprising
   (i) a diacid component comprising
      from 70 to 100 mole % residues of terephthalic acid and from 0 to 30 mole % residues of a modifying aromatic diacid having from 8 to 12 carbon atoms, and
   (ii) a glycol component comprising
      1 to 50 mole % cyclohexanedimethanol residues and
      50 to 99 mole % of a modifying glycol having 2 to 20 carbon atoms; and
(b) from greater than 2 to less than 10 weight % of a flame retardant mixture comprising a melamine and a metal phosphinate,
to form the copolyester composition,
wherein the copolyester composition has a Class 1 or Class A rating according to ASTM E-84.
wherein the copolyester composition has an energy at maximum load greater than 8 Joules measured on a 100 mm×100 mm×1.5 mm plaque according to ASTM D3763,
wherein the weight % is based on the weight of the copolyester, and
wherein the total mole % of the dicarboxylic acid component is 100 mole %, the total mole % of the glycol component is 100 mole %.

Item 59. The method of Item 58 wherein the blending comprises at least one of twin screw compounding, two-rotor continuous compounding, Banbury® batch mixer or a combination thereof.

Item 60. An article comprising a copolyester composition comprising
(a) greater than 90 to less than 98 weight % of a copolyester comprising (i) a diacid component comprising
from 70 to 100 mole % residues of terephthalic acid and
from 0 to 30 mole % residues of a modifying aromatic diacid having from 8 to 12 carbon atoms, and
(ii) a glycol component comprising
1 to 50 mole % cyclohexanedimethanol residues and
50 to 99 mole % of a modifying glycol having 2 to 20 carbon atoms; and
(b) a glycol comprising
(b) from greater than 2 to less than 10 weight % of a flame retardant mixture consisting of a melamine and a metal phosphinate,
to form the copolyester composition,
wherein the copolyester composition has a Class 1 or Class A rating according to ASTM E-84,
wherein the copolyester composition has an energy at maximum load greater than 8 Joules measured on a 100 mm×100 mm×1.5 mm plaque according to ASTM D3763.
wherein the weight % is based on the weight of the copolyester, and
wherein the total mole % of the dicarboxylic acid component is 100 mole %, the total mole % of the glycol component is 100 mole %.

Item 61. The article of Item 60 produced by extrusion, injection molding, or calendering.

Item 62. The article of Item 60 wherein the article is a film, sheet or profile.

This invention can be further illustrated by the following examples of preferred embodiments thereof, although it will be understood that these examples are included merely for purposes of illustration and are not intended to limit the scope of the invention unless otherwise specifically indicated.

EXAMPLES

The following abbreviations are used: kN is kiloNewtons; J is Joules; % NB is percent no break; J/m is Joules per meter; LOI is Loss On Ignition; wt. % is weight percent; TGA is thermographic analysis; TPA is terephthalic acid; and 1,4-CHDM is 1,4-cyclohexanedimethanol. PETG is a glycol modified polyethylene terephthalate. The PETG used in the examples is SPECTAR™ 14471 or PROVISTA™ NXT available from Eastman Chemical Company. APET EN001, EASTAR™ 15086, EB063 and TIGLAZE™ ST are copolyesters available from Eastman Chemical Company. Samples were prepared similarly by mixing the SPECTAR™ 14471 or PROVISTA NXT and the flame retardants in a 30 mm twin screw compounding extruder at approximately 450° F. to make pellets of each formulation. Samples of each formulation were then injection molded to produce test samples for flammability, tensile properties, instrumented impact, Izod impact, limiting oxygen index and thermal gravimetric analysis. Sheet samples were prepared for the ASTM E84 by mixing pellets of SPECTAR™ 14471 or PROVISTA NXT and flame retardant concentrates and extruding sheet on an extrusion line at approximately 450°. SPECTAR 14471 is a PETG modified with 31 mole % 1,4-cyclohexane dimethanol; PROVISTA NXT is a PETG modified with 31 mole % 1,4-cyclohexane dimethanol and a branching agent; APET EN001 is a PETG modified with 3.5 mole % 1,4-cyclohexane dimethanol; EB062 is a PETG modified with 50 mole % 1,4-cyclohexane dimethanol and a branching agent; TIGLAZE ST is a PETG modified with 68 mole % 1,4-cyclohexane dimethanol; and EASTAR 15086 is a PETG modified with 12 mole % 1,4-cyclohexane dimethanol.

For ASTM D638 the Type I tensile bar crosshead speed was 50.8 mm/minute. For ASTM D256 the notched Izod, method A, used samples 1.5 mm thick. For unnotched Izod measurements ASTM D4812 was used on samples 1.5 mm thick. For ASTM D3763 the initial velocity was about 3.2 meters/second; the maximum force range of the tup was 17.9 kN; the sample support diameter (clamp inside diameter) is 76.0 mm and the tup diameter is 12.8 mm. For UL94 the test used Section 8 50 W (20 mm) Vertical Burn Test: V-0, V-1 or V2.

Example 1

Flame Retarded Copolyester Composition Using Melamine Cyanurate and Aluminum Phosphinate A formulation of 90% SPECTAR™ 14471, 5% melamine cyanurate and 5% aluminum phosphinate was found to produce a combination of improved flame retardance and resistance to puncture. In a plaque of 100 mm×100 mm×1.5 mm, the 5% melamine cyanurate/5% aluminum phosphinate combination resulted in a UL 94 V-0 flammability rating, little reduction of puncture impact resistance per ASTM D3763 compared to a 100% SPECTAR™ 14471 formulation, and a no-break un-notched Izod measured per ASTM D256.

Example 2

Flame Retarded Copolyester Composition ASTM E-84 Results

The same formulation in Example 1 was extruded at a thickness of 0.060 inch and glued to gypsum board using 3M Fastbond 30 adhesive using the manufacturer's instructions and tested per ASTM E-84. Results showed that this formulation had a Flame Spread Index of 25 and a Smoke Developed Index of 185. This represents an interior flammability classification of Class A or Class 1 rating per various building codes Example 1a Non-Flame Retardant Copolyester Composition A formulation of 100% SPECTAR™ 14471 with no flame retardants has a UL 94-V0 rating of V-2, a no-break notched and un-notched Izod strength per ASTM D256 and ASTM D4812 respectively and a ductile failure mode in instrumented impact (ASTM D3637).

Example 2a

Non-Flame Retardant Copolyester Composition ASTM E-84 Results

The same formulation in Example 1a was extruded at 0.060 inch and glued to gypsum board using 3M Fastbond 30 adhesive using the manufacturer's instructions and tested per ASTM E84. Results showed this formulation had a Flame Spread Index of 80 and a Smoke Developed Index of 500. This material would not be classified under building code requirements as the Smoke Developed Index exceeded the limit of 450.

Example 3a

Flame Retarded Copolyester Composition Using Melamine Cyanurate and Aluminum Phosphinate A formulation of 85% SPECTAR™ 14471, 5% melamine cyanurate and 10% aluminum phosphinate and a formulation of 85% SPECTAR™ 14471, 10% melamine cyanurate, and 5% aluminum phosphinate were found to produce a combination of improved flame retardance, resistance to puncture, and toughness. At 1.5 mm, the 5% melamine cyanurate/10% aluminum phosphinate and 10% melamine cyanurate/5% aluminum phosphinate combination result in a UL 94 V-0 flammability rating and a no-break un-notched Izod measured per ASTM D4812. This formulation showed decreased puncture resistance and failed in a brittle manner when tested per ASTM D3637.

Example 4a

Flame Retarded Copolyester Compositions Using Melamine Cyanurate

A formulation of 95% SPECTAR™ 14471 and 5% melamine cyanurate, a formulation of 90% SPECTAR™ 14471 and 10% melamine cyanurate, a formulation of 85% SPECTAR™ 14471 and 15% melamine cyanurate were found to produce a combination of the same flame retardance of example 1a, resistance to puncture, and toughness. At 1.5 mm, these formulations result in a UL 94 V-2 flammability rating, little reduction of puncture impact resistance per ASTM D3763 compared to a 100% SPECTAR™ 14471 formulation, and a no-break un-notched Izod measured per ASTM D4812. This example shows increased sensitivity to notched impact resistance as measured by ASTM D256 with 100% brittle failures.

Example 5a

Flame Retarded Copolyester Composition Using Melamine Cyanurate ASTM E-84 Results The second formulation (90% SPECTAR™ 14471 and 10% melamine cyanurate) used in Example 4a was extruded at 0.060 inch and glued to gypsum board using 3M Fastbond 30 adhesive using the manufacturer's instructions and tested per ASTM E-84. Results showed that this formulation had a Flame Spread Index of 65 and a Smoke Developed Index of 400. This represents an interior flammability classification of Class B or Class 2 rating per various building codes.

Example 3

Flame Retarded Copolyester Compositions using Melamine Cyanurate and Melamine Cyanurate/Aluminum Phosphinate The same formulations in Example 1 and Example 4a did not chip or crack at 0.060 inch thickness when sawed on table saw. Both formulations, when scored once with a utility knife and bent tend not crack along the score. The formulation in Example 1a, however, easily cracks along the score. However, when scored multiple times in the same location, both formulations easily broke along the score. This shows that both flame retardant formulations (5% melamine cyanurate/ 5% aluminum phosphinate and 10% aluminum phosphinate) exhibit some brittle behavior during fabrication but can be successfully fabricated using proper techniques.

Example 4

Flame Retarded Copolyester Composition ASTM E-84 Results

The same formulation in Example 1 was extruded at a thickness of 0.060 inch and glued to cement board using ADH-60 mastic adhesive using the manufacturer's instructions and tested per ASTM E-84. Results showed that this formulation had a Flame Spread Index of 0 and a Smoke Developed Index of 200. This represents an interior flammability classification of Class A or Class 1 rating per various building codes and a significant improvement in results over Example 2.

Example 6

Flame Retarded Copolyester Composition ASTM E-84 Results

A formulation of 96% PROVISTA NXT/2% melamine cyanurate/2% aluminum phosphinate was extruded at a thickness of 0.080 inch and tested per ASTM E-84. Results showed that this formulation had a Flame Spread Index of 15 and a Smoke Developed Index of 250. This represents an interior flammability classification of Class A or Class 1 rating per various building codes.

Examples 6a and 6b

The same formula in Example 1 was compared to formulations containing 5% melamine cyanurate/2.5% aluminum phosphinate and 2.5% melamine cyanurate/2.5% aluminum phosphinate. All three formulations exhibited puncture resistance but the two formulations with lower loadings of the flame retardants did not achieve UL 94 V0 ratings. Burning droplets resulted in a UL 94 V2 rating for these formulas. The lower levels of flame retardant resulted in higher elongation at break and increased notched Izod strength. These results are believed to be inaccurate due to the test bars having residual stress from the molding process. Acceptable UL 94 VO ratings were obtained for the following formulations when the test bars had no residual stress as shown in Examples 10a-10d.

Example 5

Flame Retarded Copolyester Composition ASTM E-84 Results

A formulation of 96% SPECTAR™ 14471/2% melamine cyanurate/2% aluminum phosphinate was extruded at a thickness of 0.060 inch and glued to cement board using ADH-60 mastic adhesive using the manufacturer's instructions and tested per ASTM E-84. Results showed that this formulation had a Flame Spread Index of 15 and a Smoke Developed Index of 250. This represents an interior flammability classification of Class A or Class 1 rating per various building codes.

Example 7

Flame Retarded Copolyester Compositions using Melamine Polyphosphate

The same formula in Example 1 was compared to formulas containing 5 to 15% melamine polyphosphate. All of these formulations did not achieve a UL 94 V0 rating and decreased puncture resistance (Instrumented Impact ASTM D3763) with brittle failures.

Example 8

Flame Retarded Copolyester Compositions Using Melamine Cyanurate and Aluminum Phosphinate A formulation of 80% SPECTAR™ 14471, 5% melamine cyanurate and 15% aluminum phosphinate, a formulation of 80% SPECTAR™ 14471, 10% melamine cyanurate, and 10% aluminum phosphinate, a formulation of 75% SPECTAR™ 14471, 10% melamine cyanurate, 15% aluminum phosphinate, a formulation of 80% SPECTAR™ 14471, 15% melamine cyanurate, 5% aluminum phosphinate, a formulation of 75% SPECTAR™ 14471, 15% melamine cyanurate, and 10% aluminum phosphinate, a formulation of 70% SPECTAR™ 14471, 15% melamine cyanurate, and 15% aluminum phosphinate were found to produce a UL 94 V-0 flammability rating. All these formulations at 1.5 mm had brittle puncture resistance as measured by ASTM D3637 and unnotched Izod brittle failures as measured by ASTM D256.

Example 9

Flame Retarded Copolyester Composition Using Melamine Cyanurate ASTM E-84 Results The second formulation used in Example 4a was extruded at 0.060 inch and glued to gypsum board using ADH 60 mastic adhesive using the manufacturer's instructions and tested per ASTM E-84. Results showed that this formulation had a Flame Spread Index of 5 and a Smoke Developed Index of 500. This formula could not be classified since the Smoke Developed Index was greater than 450.

Example 10

Flame Retarded Copolyester Compositions Using Melamine Cyanurate and Aluminum Phosphinate A formulation (10a) of 96% SPECTAR™ 14471, 2% melamine cyanurate, and 2% aluminum phosphinate; a formulation (10b) of 95% SPECTAR™ 14471, 2.5% melamine cyanurate, and 2.5% aluminum phosphinate; a formulation (10c) of 90% Spectar™ 14471, 5% melamine cyanurate, 5% aluminum phosphinate; and a formulation (10d) of 85% SPECTAR™ 14471, 7.5% melamine cyanurate, 7.5% aluminum phosphinate were found to produce a UL 94 V-0 flammability rating. At 1.5 mm, these formulations 10a-10d result in a UL 94 V-0 flammability rating, little reduction of puncture impact resistance per ASTM D3763 compared to a 100% SPECTAR™ 14471 formulation, and a no-break un-notched Izod measured per ASTM D256. In plaques of 100 mm×100 mm×1.5 mm, the formulations 10b-10d resulted in a UL 94 V-0 flammability rating, little reduction of puncture impact resistance per ASTM D3763 compared to a 100% SPECTAR™ 14471 formulation, and a no-break un-notched Izod measured per ASTM D256.

Example 11

Flame Retarded Copolyester Composition Using Melamine Cyanurate and Aluminum Phosphinate A formulation (11a) of 95% PROVISTA NXT, 2.5% melamine cyanurate and 2.5% aluminum phosphinate; a formulation (11b) of 90% PROVISTA NXT, 5 melamine cyanurate and 5% aluminum phosphinate; and a formulation (11c) of 85% PROVISTA NXT, 7.5% melamine cyanurate and 7.5% aluminum phosphinate were found to produce a combination of improved flame retardance and resistance to puncture. In plaques of 100 mm×100 mm×1.5 mm, formulations 11a-11c resulted in a UL 94 V-0 flammability rating and little reduction of puncture impact resistance per ASTM D3763 compared to a 100% PROVISTA NXT formulation.

Example 12

Flame Retarded Copolyester Composition Using Melamine Cyanurate and Aluminum Phosphinate A formulation (12a) of 95% APET EN001, 2.5% melamine cyanurate and 2.5% aluminum phosphinate; a formulation (12b) of 90% APET EN001, 5% melamine cyanurate and 5% aluminum phosphinate; and a formulation (12c) of 85% APET EN001, 7.5% melamine cyanurate and 7.5% aluminum phosphinate were found to produce a combination of improved flame retardance and resistance to puncture. In plaques of 100 mm×100 mm×1.5 mm, the formulations 12a-12c resulted in a UL 94 V-0 flammability rating and little reduction of puncture impact resistance per ASTM D3763 compared to a 100% APET EN001 formulation.

Example 13

Flame Retarded Copolyester Composition Using Melamine Cyanurate and Aluminum Phosphinate A formulation (13a) of 95% EASTAR 15086, 2.5% melamine cyanurate and 2.5 aluminum phosphinate; a formulation (13b) of 90% EASTAR 15086, 5% melamine cyanurate and 5% aluminum phosphinate; and a formulation (13c) of 85% EASTAR 15086, 7.5% melamine cyanurate and 7.5% aluminum phosphinate were found to produce a combination of improved flame retardance and resistance to puncture. In plaques of 100 mm×100 mm×1.5 mm, the formulations 13a-13c resulted in a UL 94 V-0 flammability rating and little reduction of puncture impact resistance per ASTM D3763 compared to a 100% EASTAR 15086 formulation.

Example 14

Flame Retarded Copolyester Composition Using Melamine Cyanurate and Aluminum Phosphinate A formulation (14a) of 95% EB062, 2.5% melamine cyanurate and 2.5% aluminum phosphinate; a formulation (14b) of 90% EB062, 5% melamine cyanurate and 5% aluminum phosphinate; and a formulation (14c) of 85% EB062, 7.5% melamine cyanurate and 7.5% aluminum phosphinate were found to produce a combination of improved flame retardance and resistance to puncture. In plaques of 100 mm×100 mm×1.5 mm, the formulations 14a-14c resulted in a UL 94 V-0 flammability rating, little reduction of puncture impact resistance per ASTM D3763 compared to a 100% EB062 formulation, and a no-break un-notched Izod measured per ASTM D256.

Example 15

Flame Retarded Copolyester Composition Using Melamine Cyanurate and Aluminum Phosphinate A formulation (15a) of 95% TIGLAZE ST, 2.5% melamine cyanurate and 2.5% aluminum phosphinate; a formulation (15b) of 90% TIGLAZE ST, 5% melamine cyanurate and 5% aluminum phosphinate; and a formulation (15c) of 85% TIGLAZE ST, 7.5% melamine cyanurate and 7.5% aluminum phosphinate were found to produce a combination of improved flame retardance and resistance to puncture. In plaques of 100 mm×100 mm×1.5 mm, the formulations 14b-14c resulted in a UL 94 V-0 flammability rating, little reduction of puncture impact resistance per ASTM D3763 compared to a 100% TIGLAZE ST formulation, and a no-break un-notched Izod measured per ASTM D256.

TABLE 1

| Examples | PETG SPECTAR 14471 | Melamine Cyanurate MC 25 | Aluminum Phosphinate EXOLIT OP1240 |
|---|---|---|---|
| 1a | 100 | 0 | 0 |
| 1 | 90 | 5 | 5 |
| 3a | 85 | 5 | 10 |
| 8 | 80 | 5 | 15 |
| 3b | 85 | 10 | 5 |
| 8 | 80 | 10 | 10 |
| 8 | 75 | 10 | 15 |
| 8 | 80 | 15 | 5 |
| 8 | 75 | 15 | 10 |
| 8 | 70 | 15 | 15 |
| 4a | 95 | 5 | 0 |
| 4a | 90 | 10 | 0 |
| 4a | 85 | 15 | 0 |
| 7 | 95 | 0 | 0 |
| 7 | 90 | 0 | 0 |
| 7 | 85 | 0 | 0 |

| Examples | Melamine Polyphosphate MELAPUR 200 | UL94 Burn Time (sec) | UL94 Rating | UL94 Comment |
|---|---|---|---|---|
| 1a | 0 | 1.7 | V2 | dripped, ignited cotton |
| 1 | 0 | 0.1 | V0 | dripped, did not ignite cotton |
| 3a | 0 | 0.3 | V0 | dripped, did not ignite cotton |
| 8 | 0 | 0 | V0 | dripped, did not ignite cotton |
| 3a | 0 | 0 | V0 | dripped, did not ignite cotton |
| 8 | 0 | 0.1 | V0 | dripped, did not ignite cotton |
| 8 | 0 | 3 | V0 | dripped, did not ignite cotton |
| 8 | 0 | 0 | V0 | dripped, did not ignite cotton |
| 8 | 0 | 0 | V0 | dripped, did not ignite cotton |
| 8 | 0 | 0.1 | V0 | dripped, did not ignite cotton |
| 4a | 0 | 0.6 | V2 | dripped, ignited cotton |
| 4a | 0 | 0.5 | V2 | dripped, ignited cotton |
| 4a | 0 | 0.6 | V2 | dripped, ignited cotton |
| 7 | 5 | 0.7 | V2 | dripped, ignited cotton |
| 7 | 10 | 0.6 | V2 | dripped, ignited cotton |
| 7 | 15 | 0.7 | V2 | dripped, ignited cotton |

| Examples | Instrumented Impact ASTM D3763 Max Load (kN) | Energy at max load (J) | Total Energy (J) | % brittle | IZOD ASTM Notched ASTM D256 % NB | IZOD ASTM Notched ASTM D256 J/m | IZOD ASTM Unnotched ASTM D4812 % NB | IZOD ASTM Unnotched ASTM D4812 J/m |
|---|---|---|---|---|---|---|---|---|
| 1a | 2.07 | 16.34 | 24.7 | 0 | 100 | | 100 | |
| 1 | 2 | 14.01 | 19.61 | 0 | 40 | 45.28 | 100 | |
| 3a | 1.69 | 7.98 | 8.59 | 100 | 30 | 32.94 | 100 | |
| 8 | 0.36 | 0.38 | 0.53 | 100 | 30 | 33.35 | 10 | 529.69 |
| 3a | 0.76 | 1.8 | 1.96 | 100 | 60 | 35.51 | 100 | |
| 8 | 0.32 | 0.17 | 0.38 | 100 | 60 | 18.55 | 0 | 413.9 |
| 8 | 0.36 | 0.16 | 0.24 | 100 | 50 | 27.75 | 0 | 275.1 |
| 8 | 0.33 | 0.17 | 0.44 | 100 | 30 | 30.17 | 50 | 454 |
| 8 | 0.31 | 0.11 | 0.14 | 100 | 50 | 20.28 | 0 | 327.56 |
| 8 | 0.31 | 0.12 | 0.15 | 100 | 60 | 18.34 | 0 | 210.18 |
| 4a | 2.02 | 16.01 | 22.5 | 0 | 20 | 63.97 | 100 | |
| 4a | 1.96 | 13.76 | 20.85 | 0 | 0 | 51.97 | 100 | |
| 4a | 1.87 | 12.8 | 17.75 | 0 | 0 | 43.9 | 100 | |
| 7 | 1.41 | 8.49 | 10.63 | 80 | 0 | 64.91 | 100 | |
| 7 | 1.49 | 6.81 | 8 | 80 | 50 | 44.06 | 30 | 330.99 |
| 7 | 0.9 | 3.03 | 3.08 | 100 | 10 | 34.89 | 10 | 378.85 |

TABLE 1-continued

| | | TGA | | Tensile ASTM D638 | | | |
|---|---|---|---|---|---|---|---|
| | | Temp. at 10% | | | | | |
| Examples | LOI % oxygen | weight loss ° C. | wt. % at 600 C | yield strength Mpa | % elongation yield | break strength Mpa | % elongation at break |
| 1a | 25.6 | 425.86 | 6.58 | 50.7 | 3.8 | 44.3 | 228.2 |
| 1 | 28.2 | 404.65 | 10.89 | 47.5 | 3.4 | 26.5 | 11.9 |
| 3a | 34 | 388.23 | 14.11 | 44.2 | 3 | 32.8 | 5.5 |
| 8 | >40 | 389.45 | 15.49 | 41.6 | 2.7 | 38.3 | 3.5 |
| 3a | 29.7 | 374.3 | 11.11 | 45.3 | 3.1 | 35.5 | 5.3 |
| 8 | 35 | 373.24 | 13.26 | 42.8 | 2.7 | 41.3 | 3.1 |
| 8 | >40 | 376.14 | 14.67 | 40.8 | 2.4 | 40.5 | 2.6 |
| 8 | 29.3 | 373.76 | 11.82 | 44.5 | 2.8 | 39 | 4 |
| 8 | 34 | 387.43 | 8.203 | no data | | 42.3 | 2.5 |
| 8 | | no sample | | no data | | 41.3 | 2.3 |
| 4a | 33.6 | 374.69 | 5.425 | 50.2 | 3.7 | 28.1 | 34.3 |
| 4a | 34 | 380.29 | 5.498 | 48.3 | 3.4 | 27 | 28.3 |
| 4a | 35.2 | 400.16 | 5.441 | 47 | 3.2 | 27.1 | 9.5 |
| 7 | 30.2 | 372.18 | 10.75 | 51.6 | 3.7 | 28.6 | 42.7 |
| 7 | 30 | 373.76 | 11.82 | 52 | 3.5 | 28.5 | 12.2 |
| 7 | 32.2 | 378.71 | 9.391 | 52.7 | 3.3 | 29.7 | 6.3 |

TABLE 2

| Examples | SPECTAR 14471 | Melapur MC 25 | EXOLIT OP1240 | ASTM E84 FLAME SPREAD | ASTM E84 SMOKE DEVELOPED |
|---|---|---|---|---|---|
| 2 | 90 | 5 | 5 | 25 | 185 |
| 5a | 90 | 10 | 0 | 65 | 400 |
| 2a | 100 | 0 | 0 | 80 | 500 |

TABLE 3

| | Instrumented Impact | | | |
|---|---|---|---|---|
| Examples 0.060" | Max Load (kN) | Energy @ max load (J) | Total Energy (J) | % brittle |
| 1 | 1.9 | 16.23 | 19.92 | 0 |
| 6a | 1.98 | 17.53 | 21.04 | 0 |
| 6b | 1.98 | 18.1 | 21.99 | 0 |

TABLE 3-continued

| | Tensile | | | | IZOD (notched) | |
|---|---|---|---|---|---|---|
| Examples 0.060" | yield strength | % elongation yield | break strength | % elongation break | % complete breaks | J/m |
| 1 | 47.3 | 3.5 | 27.2 | 8 | 100 | 59.79 |
| 6a | 48.1 | 3.6 | 32.9 | 146.1 | 100 | 63.07 |
| 6b | 48.8 | 3.7 | 32.4 | 136.2 | 100 | 71.69 |

| Examples 0.060" | UL94 | | |
|---|---|---|---|
| | Burn Time | Rating | Comment |
| 1 | 0.2 | V0 | dripped, did not ignite |
| 6a | 0.3 | V2 | (2) dripped, did not ignite (3) dripped, did ignite |
| 6b | 0.3 | V2 | (2) dripped, did not ignite (3) dripped, did ignite |

TABLE 4

| Sample | Example 1 | Example 6a | Example 6b |
|---|---|---|---|
| SPECTAR 14471 | 90 | 92.5 | 95 |
| OP1240 | 5 | 2.5 | 2.5 |
| MC 25 | 5 | 5 | 2.5 |
| | 0 | 0 | 0 |
| Total weight % | 100 | 100 | 100 |

TABLE 5

| | | | Entire test duration | |
|---|---|---|---|---|
| Examples | Formulation | Construction | Flame Spread | Smoke Developed |
| 5a | 90% Spectar/10% MC 25 | 60 mil + Gypsum Board + Fastbond 30 | 65 | 400 |
| 9 | 90% Spectar/10% MC 25 | 60 mil + Cement Board + ADH-60 Mastic Adhesive | 5 | over 500 |
| 2 | 90% Spectar/5% MC 25/5% OP 1240 | 60 mil + Gypsum Board + Fastbond 30 | 25 | 185 |

TABLE 5-continued

| Examples | Formulation | Construction | Flame Spread (Entire test duration) | Smoke Developed (Entire test duration) |
|---|---|---|---|---|
| 4 | 90% Spectar/5% MC 25/5% OP 1240 | 60 mil + Cement Board + ADH-60 Mastic Adhesive | 0 | 200 |
| 5 | 90% Spectar/2% MC 25/2% OP 1240 | 60 mil + Cement Board + ADH-60 Mastic Adhesive | 15 | 250 |
| 6 | 90% Provista NXT/2% MC 25/2% OP 1240 | .080" Unsupported sheet | 5 | 250 |

TABLE 6

| Sample ID | MC 25 % | OP 1240 % | Burn Time (sec) | UL 94 Rating | Comment |
|---|---|---|---|---|---|
| 12 | | | 2.2 | 94V-2 | (5) dripped, ignited |
| 12a | 2.5 | 2.5 | 1 | 94V-0 | dripped, did not ignite |
| 12b | 5 | 5 | 1 | 94V-0 | dripped, did not ignite |
| 12c | 7.5 | 7.5 | 0 | 94V-0 | dripped, did not ignite |
| 13 | | | 1 | 94V-2 | dripped, ignited cotton |
| 13a | 2.5 | 2.5 | 0 | 94V-0 | dripped, did not ignite |
| 13b | 5 | 5 | 0 | 94V-0 | dripped, did not ignite |
| 13c | 7.5 | 7.5 | 0 | 94V-0 | dripped, did not ignite |
| 11 | | | 2 | 94V-2 | (5) dripped, ignited |
| 11a | 2.5 | 2.5 | 1 | 94V-0 | dripped, did not ignite |
| 11b | 5 | 5 | 0 | 94V-0 | dripped, did not ignite |
| 11c | 7.5 | 7.5 | 1 | 94V-0 | dripped, did not ignite |
| 10 | | | 2.6 | 94V-2 | (5) dripped, ignited |
| 10a | 2 | 2 | 1 | 94V-0 | dripped, did not ignite |
| 10b | 2.5 | 2.5 | 1 | 94V-0 | dripped, did not ignite |
| 10c | 5 | 5 | 1 | 94V-0 | dripped, did not ignite |
| 10d | 7.5 | 7.5 | 1 | 94V-0 | dripped, did not ignite |
| 14 | | | 2.1 | 94V-2 | (5) dripped, ignited |
| 14a | 2.5 | 2.5 | 1.2 | 94V-0 | dripped, did not ignite |
| 14b | 5 | 5 | 0 | 94V-0 | dripped, did not ignite |
| 14c | 7.5 | 7.5 | 1 | 94V-0 | dripped, did not ignite |
| 15 | | | 1.9 | 94V-2 | (5) dripped, ignited |
| 15a | 2.5 | 2.5 | 1 | 94V-2 | (3) dripped, did not ignite (2) dripped, ignited |
| 15b | 5 | 5 | 1 | 94V-0 | dripped, did not ignite |
| 15c | 7.5 | 7.5 | 0 | 94V-0 | dripped, did not ignite |

| Sample ID | Instrumented Impact ASTM D3736 Max Load (kN) | Energy at max load (J) | Total Energy (J) | % brittle | Izod Notched ASTM D256 % no breaks | Total Energy (J) |
|---|---|---|---|---|---|---|
| 12 | 4.16 | 34.41 | 54.65 | 0 | | 54.2 |
| 12a | 4.11 | 34.84 | 49.72 | 0 | | 36.9 |
| 12b | 3.33 | 24.85 | 33.65 | 40 | | 35.4 |
| 12c | 3.49 | 26.35 | 34.7 | 40 | | 32.1 |
| 13 | 3.87 | 33.64 | 49.22 | 0 | | 55.6 |
| 13a | 3.19 | 25.67 | 39.6 | 20 | | 39.5 |
| 13b | 3.63 | 30.42 | 47.04 | 0 | | 36.8 |
| 13c | 2.79 | 21.22 | 33.76 | 20 | | 33.2 |
| 11 | 3.79 | 32.73 | 53.56 | 0 | | 76.5 |
| 11a | 3.87 | 33.66 | 50.15 | 0 | | 45.4 |
| 11b | 3.75 | 32.22 | 49.68 | 0 | | 41.8 |
| 11c | 3.83 | 33.14 | 47.88 | 0 | | 40.5 |
| 10 | 3.88 | 34.73 | 53.71 | 0 | | 81 |
| 10a | | | | | | |
| 10b | 3.94 | 33.88 | 51.55 | 0 | 11 | 57.6 |
| 10c | 3.83 | 33.41 | 49.81 | 0 | | 53.2 |
| 10d | 3.86 | 33.91 | 51.04 | 0 | | 50 |
| 14 | 4.02 | 38.28 | 55.37 | 0 | 70 | 991.7 |
| 14a | 3.72 | 32.23 | 49.58 | 0 | | 71.9 |
| 14b | 3.67 | 31.59 | 48.15 | 0 | | 62.7 |
| 14c | 3.73 | 33.15 | 48.64 | 0 | | 62.3 |
| 15 | 3.93 | 39.21 | 57.47 | 0 | 100 | 1738.9 |
| 15a | 4.05 | 38.88 | 54.58 | 0 | | 71.5 |
| 15b | 3.93 | 36.71 | 50.59 | 0 | | 67.8 |
| 15c | 3.78 | 34.67 | 48.24 | 0 | | 62.3 |

| Sample ID | Izod Unnotched ASTM D4812 % no breaks | LOI % oxygen | TGA Temp. @10% weight loss | TGA wt. % at 600 C. |
|---|---|---|---|---|
| 12 | 100 | 30.7 | 428.3 | 9.848 |
| 12a | 89 | 36.4 | 421.81 | 13.06 |
| 12b | 10 | 42.7 | 418.81 | 13.05 |
| 12c | 10 | 44.7 | 413.69 | 12.91 |
| 13 | 100 | 30.3 | 422.27 | 6.219 |
| 13a | 100 | 35.5 | 417.33 | 10.59 |
| 13b | 88 | 36.5 | 417.94 | 10.53 |
| 13c | 20 | 37.9 | 412.86 | 11.47 |
| 11 | 100 | 28.2 | 422.96 | 4.957 |
| 11a | 100 | 33.5 | 414.91 | 7.969 |
| 11b | 100 | 35.9 | 414.58 | 10.17 |
| 11c | 70 | 37 | 411.61 | 10.88 |
| 10 | 100 | 27.7 | 418.24 | 3.164 |
| 10a | 100 | | | |
| 10b | 100 | 33.7 | 413.87 | 7.834 |
| 10c | 100 | 36 | 410.6 | 7.816 |
| 10d | 100 | 36.4 | 414.37 | 9.009 |
| 14 | 100 | 26.5 | 420.48 | 1.923 |
| 14a | 100 | 30.7 | 413.07 | 4.154 |
| 14b | 100 | 32.8 | 412.52 | 5.676 |
| 14c | 100 | 31.7 | 408.82 | 6.206 |
| 15 | 100 | 25 | 416.64 | 1.13 |
| 15a | 100 | 30 | 411.74 | 3.674 |
| 15b | 100 | 2 | 417.41 | 4.748 |
| 15c | 100 | 32.9 | 413.15 | 5.303 |

| Sample ID | Tensile ASTM D638 Yield strength (Mpa) | % elongation @yield | Break strength (Mpa) | % elongation @break |
|---|---|---|---|---|
| 12 | 59 | 3.9 | 30.9 | 178.8 |
| 12a | 58.9 | 3.9 | 29.4 | 262.1 |
| 12b | 57.8 | 3.8 | 33.2 | 292.3 |
| 12c | 56.9 | 3.8 | 27.3 | 49.9 |
| 13 | 57.5 | 3.9 | 26.7 | 183 |
| 13a | 56.7 | 3.9 | 25.3 | 188.6 |
| 13b | 55.8 | 3.9 | 26.3 | 211.7 |
| 13c | 55.2 | 3.8 | 22.7 | 74.6 |
| 11 | 56.8 | 4.1 | 22.1 | 54.2 |
| 11a | 56.5 | 4.1 | 23.2 | 18.7 |
| 11b | 55.3 | 4 | 23.6 | 15 |
| 11c | 54.9 | 3.9 | 23.6 | 12 |
| 10 | 52.5 | 4.1 | 24.1 | 39 |
| 10a | | | | |
| 10b | 52.3 | 4.1 | 25.3 | 27.7 |
| 10c | 51.9 | 4 | 21.7 | 22 |
| 10d | 51.6 | 4 | 25.4 | 21 |
| 14 | 49.3 | 4.4 | 42 | 284.5 |
| 14a | 49.3 | 4.3 | 38 | 201.5 |
| 14b | 49 | 4.1 | 28.7 | 121.8 |
| 14c | 49.1 | 4.1 | 29.3 | 102.1 |

TABLE 6-continued

| 15  | 38.1 | 4   | 38.5 | 256.8 |
| 15a | 46.8 | 4.4 | 44.4 | 284.8 |
| 15b | 46.6 | 4.2 | 30.5 | 198.2 |
| 15c | 47   | 4.1 | 31.4 | 156.1 |

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A copolyester composition comprising:
   (a) from about 96 to less than 98 weight % of the copolyester, the copolyester comprising
      (i) a diacid component comprising
         from 70 to 100 mole % residues of terephthalic acid,
         from 0 to 30 mole % residues of a modifying aromatic diacid having from 8 to 12 carbon atoms, and
         from 0 to 10 mole % residues of an aliphatic dicarboxylic acid; and
      (ii) a glycol component comprising
         from 1 to 65 mole % cyclohexanedimethanol residues and
         from 35 to 99 mole % of a modifying glycol having 2 to 20 carbon atoms;
   (b) from greater than 2 to about 4 weight % of a flame retardant mixture comprising (i) a melamine and (ii) a metal phosphinate,
      wherein the copolyester composition has (1) a UL 94 V0 rating or (2) a Class 1 or Class A rating according to ASTM E-84,
      wherein the copolyester composition has an energy at maximum load greater than 8 Joules measured on a 100 mm×100 mm×1.5 mm plaque according to ASTM D3763,
      wherein the weight % is based on the weight of the copolyester,
      wherein the total mole % of the dicarboxylic acid component is 100 mole % and the total mole % of the glycol component is 100 mole %.

2. The copolyester composition according to claim 1 wherein the melamine comprises a melamine isocyanurate, a melamine polyphosphate, a melamine phosphate or a mixture thereof.

3. The copolyester composition according to claim 1 wherein the metal phosphinate comprises an aluminum phosphinate, a zinc phosphinate or a mixture thereof.

4. The copolyester composition according to claim 1 wherein the flame retardant mixture comprises at least 2.5 weight % of the melamine or the metal phosphinate.

5. The copolyester composition according to claim 1 wherein the copolyester composition further comprises an anti-drip agent or an impact modifier or mixtures thereof.

6. A method of making a copolyester composition, the method comprising blending:
   (a) from about 96 to less than 98 weight % of a copolyester comprising
      (i) a diacid component comprising
         from 70 to 100 mole % residues of terephthalic acid and
         from 0 to 30 mole % residues of a modifying aromatic diacid having from 8 to 12 carbon atoms, and
         from 0 to 10 mole % residues of an aliphatic dicarboxylic acid; and
      (ii) a glycol component comprising
         from 1 to 65 mole % cyclohexanedimethanol residues and
         from 35 to 99 mole % of a modifying glycol having 2 to 20 carbon atoms; and
   (b) from greater than 2 to about 4 weight % of a flame retardant mixture comprising a melamine and a metal phosphinate,
   to form the copolyester composition,
      wherein the copolyester composition has (1) a UL 94 V0 rating or (2) a Class 1 or Class A rating according to ASTM E-84,
      wherein the copolyester composition has an energy at maximum load greater than 8 Joules measured on a 100 mm×100 mm×1.5 mm plaque according to ASTM D3763,
      wherein the weight % is based on the weight of the copolyester,
      wherein the total mole % of the dicarboxylic acid component is 100 mole % and the total mole % of the glycol component is 100 mole %.

7. The method of making a copolyester composition according to claim 6 wherein the blending comprises at least one of twin screw compounding, two-rotor continuous compounding, Banbury® batch mixer or a combination thereof.

8. An article comprising a copolyester composition comprising:
   (a) from about 96 to less than 98 weight % of a copolyester comprising
      (i) a diacid component comprising
         from 70 to 100 mole % residues of terephthalic acid and
         from 0 to 30 mole % residues of a modifying aromatic diacid having from 8 to 12 carbon atoms, and
         from 0 to 10 mole % residues of an aliphatic dicarboxylic acid; and
      (ii) a glycol component comprising
         from 1 to 65 mole % cyclohexanedimethanol residues and
         from 35 to 99 mole % of a modifying glycol having 2 to 20 carbon atoms; and
   (b) from greater than 2 to about 4 weight % of a flame retardant mixture consisting of a melamine and a metal phosphinate,
   to form the copolyester composition,
      wherein the copolyester composition has (1) a UL 94 V0 rating or (2) a Class 1 or Class A rating according to ASTM E-84,
      wherein the copolyester composition has an energy at maximum load greater than 8 Joules measured on a 100 mm×100 mm×1.5 mm plaque according to ASTM D3763,
      wherein the weight % is based on the weight of the copolyester,
      wherein the total mole % of the dicarboxylic acid component is 100 mole % and the total mole % of the glycol component is 100 mole %.

9. The article according to claim 8 wherein the article is produced by extrusion, extrusion blow molding, injection molding, blown film process or calendering.

10. The article according to claim 9 wherein the article is a film, sheet or profile.

* * * * *